United States Patent
Akella et al.

(10) Patent No.: US 12,107,898 B2
(45) Date of Patent: *Oct. 1, 2024

(54) DYNAMIC HYPER CONTEXT-DRIVEN MICROSEGMENTATION

(71) Applicant: Netskope, Inc., Santa Clara, CA (US)

(72) Inventors: Srinivas Akella, San Jose, CA (US); Arun Kumar Dheena, San Jose, CA (US)

(73) Assignee: NETSKOPE, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/322,256

(22) Filed: May 23, 2023

(65) Prior Publication Data

US 2023/0344872 A1    Oct. 26, 2023

Related U.S. Application Data

(63) Continuation of application No. 17/080,622, filed on Oct. 26, 2020, now Pat. No. 11,700,282.

(51) Int. Cl.
*H04L 9/40* (2022.01)

(52) U.S. Cl.
CPC .......... *H04L 63/20* (2013.01); *H04L 63/0876* (2013.01)

(58) Field of Classification Search
CPC .... H04L 63/20; H04L 63/0876; H04L 63/101
USPC .......................................................... 726/1
See application file for complete search history.

(56) References Cited

U.S. PATENT DOCUMENTS 11,700,282 B2 * 7/2023 Akella ............... H04L 63/0876
726/1

\* cited by examiner

*Primary Examiner* — Kambiz Zand
*Assistant Examiner* — Aubrey H Wyszynski
(74) *Attorney, Agent, or Firm* — David R. Stevens; Stevens Law Group

(57) ABSTRACT

Systems and methods for dynamic, hyper context-based microsegmentation are described. In one aspect, a computing device is detected on a network. A network hyper context is assigned to the computing device based on network properties and computing device properties associated with the computing device. A policy defining a segment identifier identifying a network segment and corresponding to the network hyper context is accessed. The segment identifier is assigned to the computing device. The computing device is segmented onto the network responsive to detecting the computing device.

23 Claims, 16 Drawing Sheets

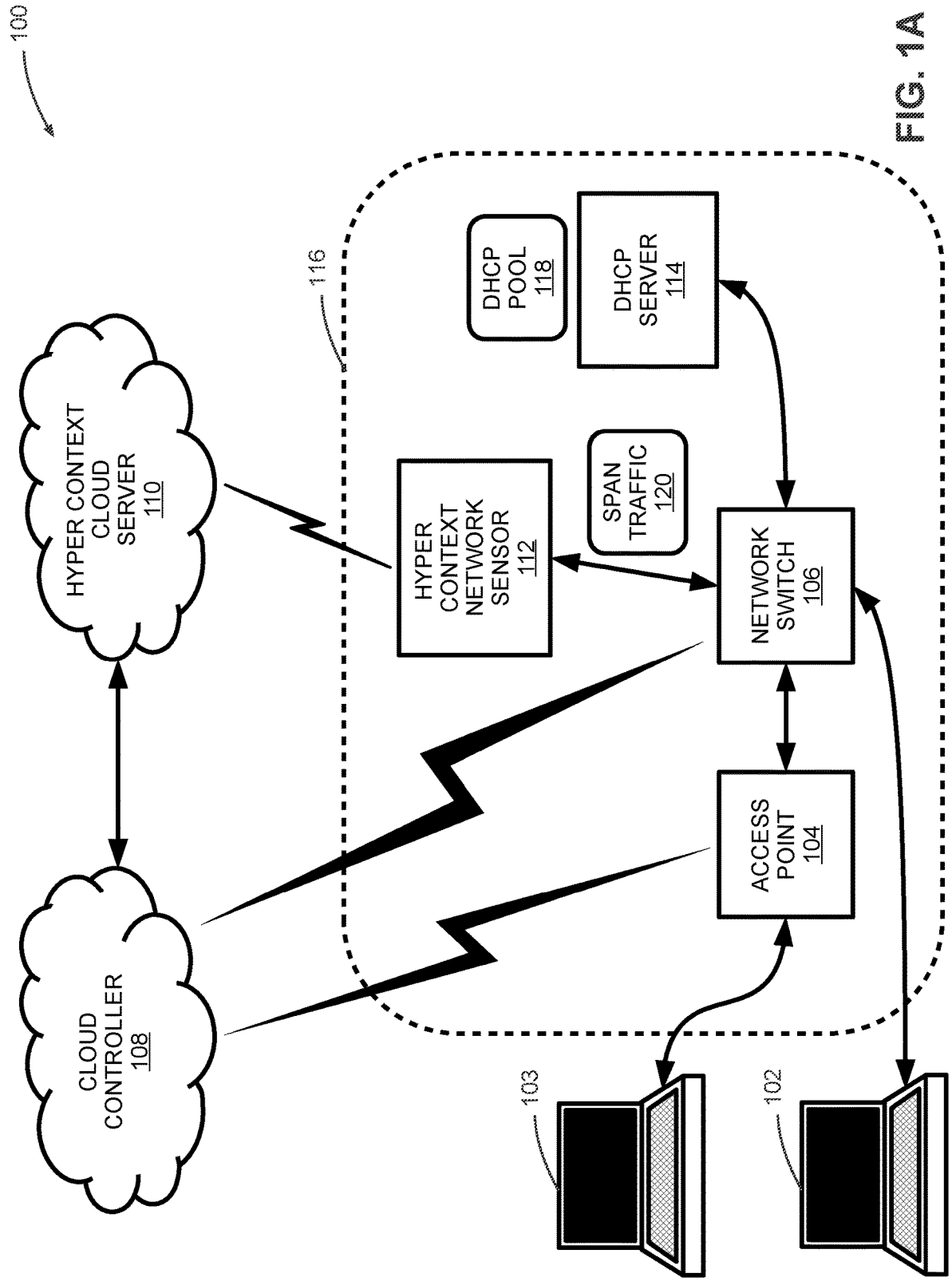

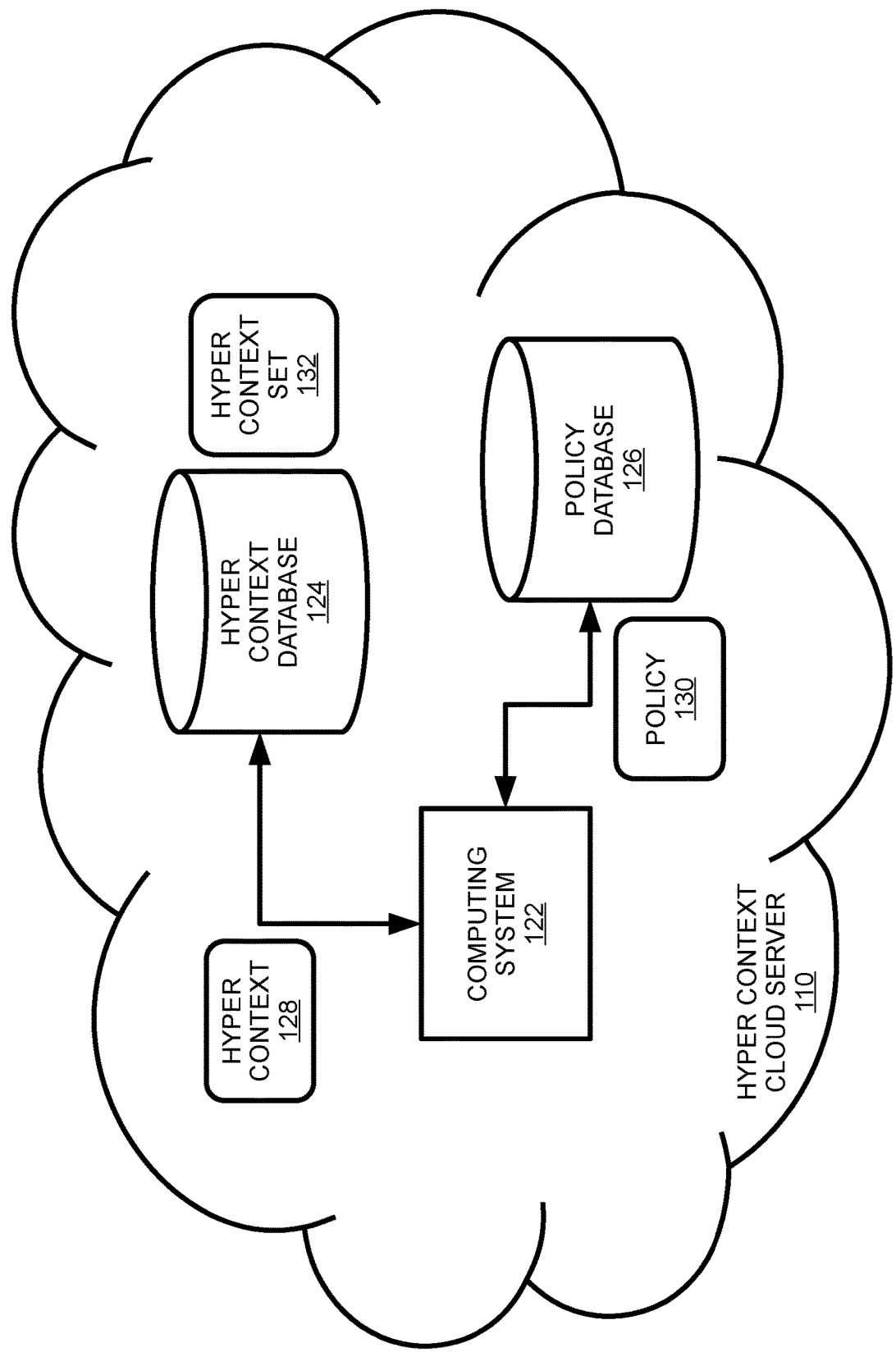

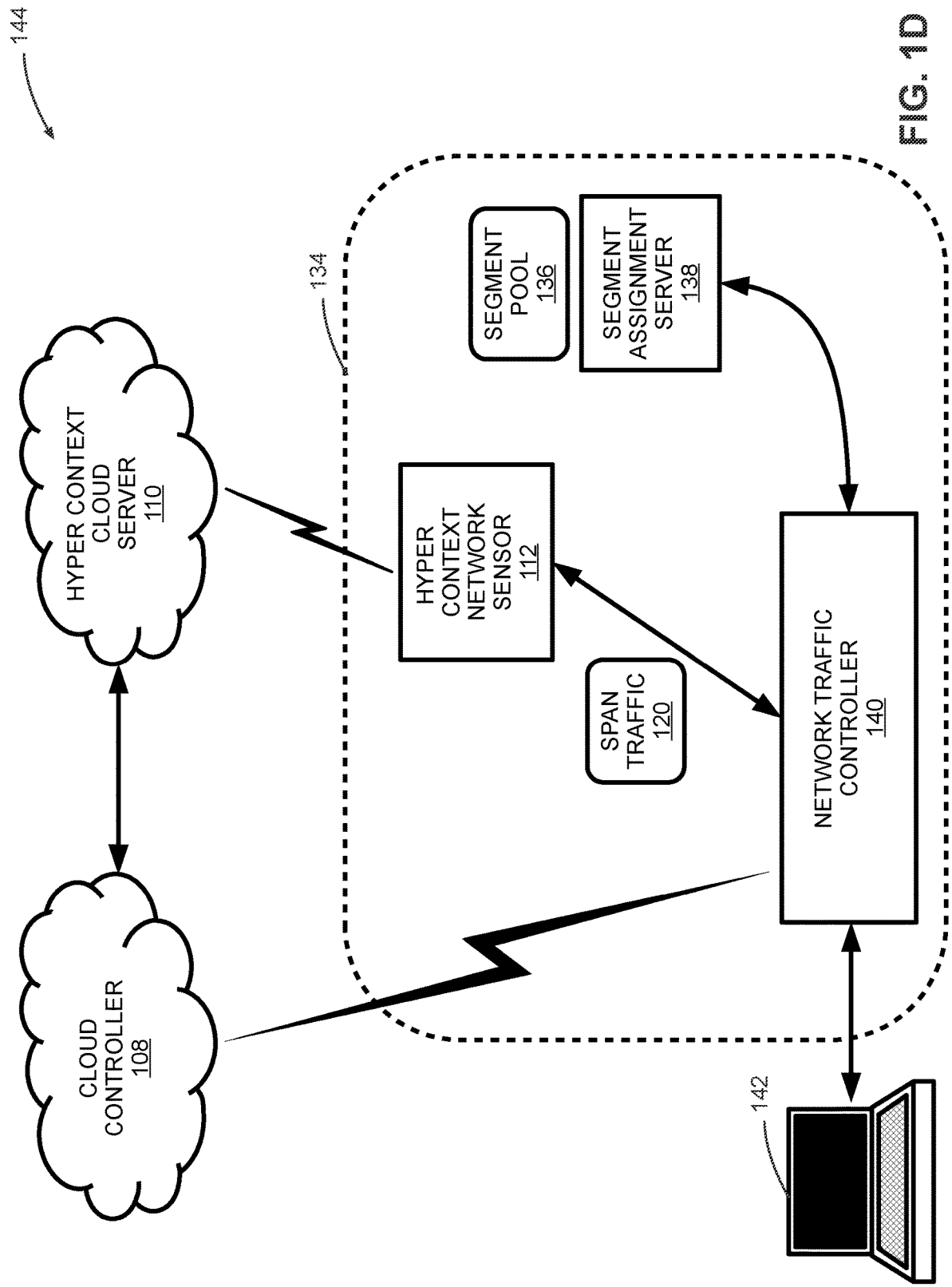

DYNAMIC HYPER CONTEXT-DRIVEN MICROSEGMENTATION

CROSS-REFERENCE TO RELATED PATENT APPLICATION

The present disclosure is a continuation of U.S. patent application Ser. No. 17/080,622, filed on Oct. 26, 2020, which is hereby incorporated by reference in its entirety.

BACKGROUND

Technical Field

The present disclosure relates to systems and methods that enable dynamic segmentation of a networked computing device onto an appropriate segment associated with the network.

BACKGROUND ART

Contemporary network implementations typically include segments such as one or more virtual local area networks (VLANs). A computing device is typically placed onto a segment after an authentication process. In contemporary network implementations, a VLAN is assigned based on user authentication. Furthermore, if the computing device moves from one physical location to another in an institution associated with the network, the computing device may be transferred to a different segment on the network. For example, if the segment is a VLAN, the computing device may be transferred from a first VLAN to a second VLAN if a user associated with the computing device moves from one physical location in the institution to another.

SUMMARY

Aspects of the invention are directed to systems, methods and computer program products for dynamically assigning a computing device to a segment in a network.

In one aspect, a computing device is detected on a network. A network hyper context (also referred to as a "hyper context," a "hypercontext," or a "computer network hyper context") is assigned to the computing device based on network properties and computing device properties associated with the computing device. A policy defining a segment identifier as the action is accessed; the segment identifier identifies a network segment and corresponds to the network hyper context. The segment identifier is assigned to the computing device, and the computing device is segmented onto the network segment responsive to detecting the computing device. In some aspects, the network is a computer network, and the segment is a VLAN.

In another aspect, segmentation is performed for a networked computing device associated with a network. The computer network includes a network traffic controller configured to enable an interface of a computing device the network, and a hyper context network sensor configured to observe span traffic associated with the network and detect the computing device on the network via the network traffic controller. The hyper context network sensor is connected to a hyper context cloud server. The hyper context cloud server is connected to a cloud controller. Collectively, the hyper context network sensor, the hyper context cloud server, and the cloud controller are configured to dynamically assign a segment associated with the network to a computing device.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1A is a block diagram depicting an example computer architecture of a dynamic microsegmentation system.

FIG. 1C is a block diagram depicting an example computer architecture of a hyper context cloud server.

FIG. 1D is a block diagram depicting an example computer architecture of a dynamic microsegmentation system.

DETAILED DESCRIPTION

Figure 1B:
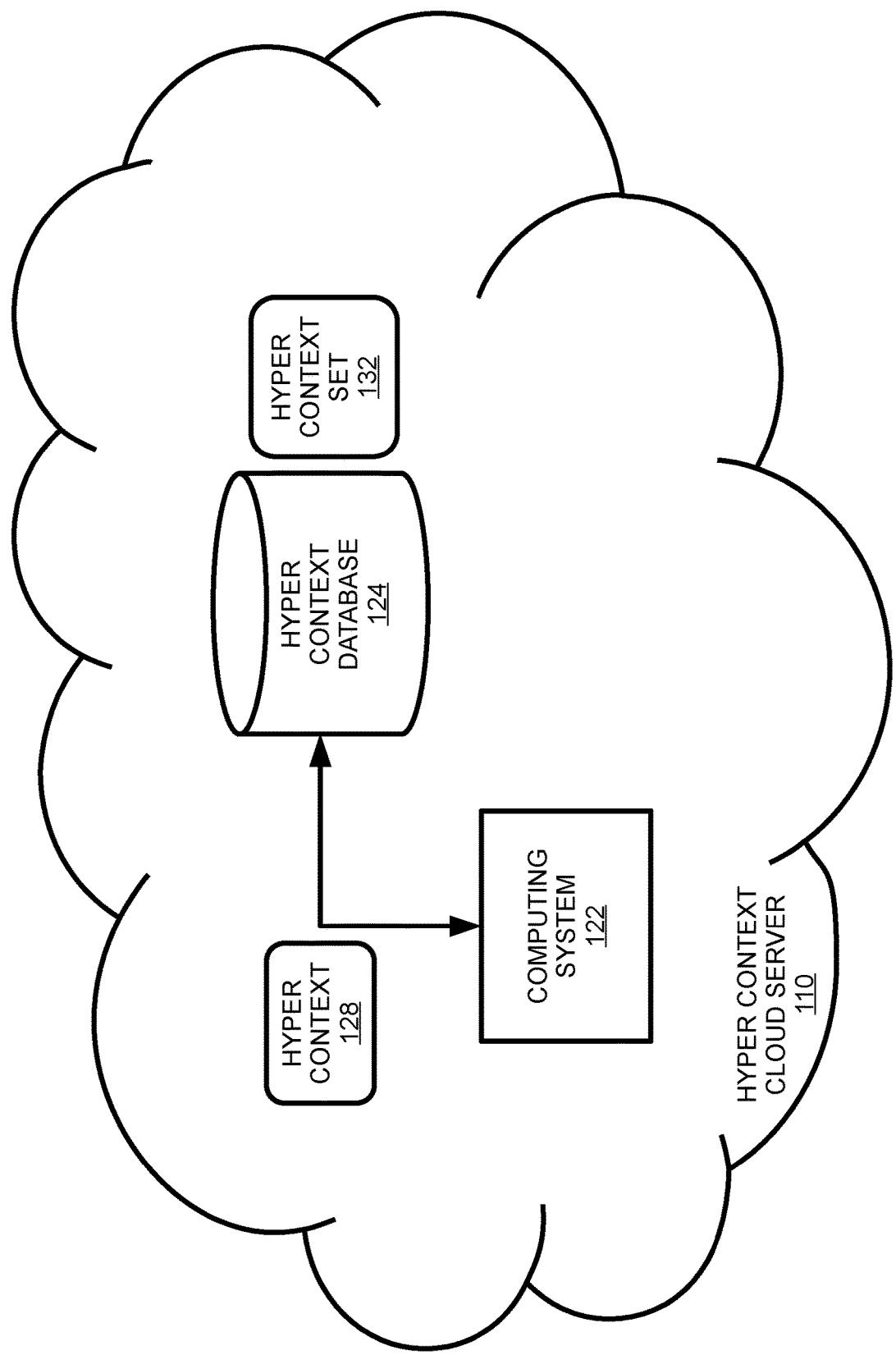
FIG. 1B is a block diagram depicting an example computer architecture of a hyper context cloud server.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein are configured to segment a computing device on a network responsive to detecting the computing device. A method for segmenting a computing device on a network includes assigning a segment identifier to the computing device. The segment identifier is determined based on a policy corresponding to a network hyper context associated with the computing device.

FIG. 1A is a block diagram depicting an example computer architecture of a dynamic microsegmentation system 100. In one aspect, dynamic microsegmentation system 100 includes a computer network 116. Computer network 116 further includes a hyper context network sensor 112, a network switch 106, an access point 104, and a DHCP server 114. Dynamic microsegmentation system 100 also includes a hyper context cloud server 110, and a cloud controller 108. A computing device 102 and a computing device 103 may be associated with computer network 116.

In an aspect, computing device 102 and computing device 103 are connected to or attempt to connect to computer network 116. Computing devices 102, 103 (and other computing devices connected to or attempting to connect to computer network 116) can include any combination of desktop computers, laptop computers, mobile devices such as tablets and cellular phones, internet-of-things (IoT) devices, printers, smart televisions, audio conferencing devices, medical smart devices, or any other computing devices. In general, computer network 116 can include one or more internetworked computing devices. Within this description and the following claims, a "computing device" is defined as any device that includes at least a processor, system memory, and a network interface.

In an aspect, computing device 102 is connected to or attempts to connect with computer network 116 via network switch 106. In an aspect, network switch 106 may be an Ethernet switch, an Ethernet router, or a trunk port that enables hardwired network connectivity for computing device 102. Computing device 102 may be connected to network switch 106 via an Ethernet interface. Computing device 102 may communicate on computer network 116 via an Ethernet protocol.

Computing device 103 is connected to or attempts to connect with computer network 116 via access point 104 which is further communicatively coupled to network switch 106. In an aspect, access point 104 is a Wi-Fi access point that communicates with computing device 103 via a Wi-Fi communication protocol. Access point 104 and network switch 106 may communicate with each other via an Ethernet protocol.

In general, a computing device may be connected to or attempt to connect with computer network 116 using any combination of wired and wireless communication protocols such as Ethernet, USB, Wi-Fi, Bluetooth, Bluetooth Low Energy (BLE), ZigBee, Long-Term Evolution (LTE), Lorawan, zwave, etc. Accordingly, computer network 116 may include any component that enables an interface of a computing device to computer network 116 via an appropriate communication protocol.

Computing devices 102 and 103 communicate over computer network 116 via network switch 106. In an aspect, span traffic 120 is associated with communication corresponding to any computing device connected to or attempting to connect to computer network 116. Span traffic 120 may be observed and received by hyper context network sensor 112. In an aspect, span traffic 120 is a copy of any network traffic associated with computer network 116. Hyper context network sensor 112 transmits data associated with span traffic 120 to hyper context cloud server 110. In an aspect, this data may be referred to as "span meta data." Hyper context cloud server 110 is configured to assign a hyper context to a computing device responsive to analyzing the data associated with span traffic 120 received from hyper context network sensor 112.

In an aspect, hyper context cloud server 110 is configured to access a policy associated with a VLAN identifier identifying a VLAN on computer network 116. Cloud controller 108 receives the VLAN identifier from hyper context cloud server 110, and segments the computing device onto the VLAN based on the policy and the VLAN identifier. The process of segmenting may be performed by DHCP server 114 via, for example, using a dynamic host configuration protocol (DHCP). DHCP server 114 is configured to access a DHCP pool 118 containing a list of VLANs associated with computer network 116. Cloud controller 108 may be implemented using any combination of cloud-managed access points, cloud-managed network devices, and network access controllers, and communication between hyper context cloud server 110 and cloud controller 108 may be accomplished via cloud controller API calls.

In another aspect, the policy is generated by cloud controller 108 responsive to receiving the hyper context from hyper context cloud server 110. In yet another aspect, all functions of cloud controller 108 (including policy access, VLAN enforcement, and computing device segmentation onto a VLAN) may be performed completely by hyper context cloud server 110.

As an example, consider computing device 103 trying to connect with computer network 116 via access point 104. DHCP pool 118 may include the following three IP pools:

| (IP Pool) | (VLAN) | (Subnet) |
|---|---|---|
| IP Pool 0 | VLAN 1 | 10.1.1.0/24 |
| IP Pool 1 | VLAN 10 | 10.1.10.0/24 |
| IP Pool 3 | VLAN 20 | 10.1.20.0/24 |

Cloud controller 108 and hyper context cloud server 110 may be associated with the following three policies associated with the three IP pools in DHCP pool 118:

| (Policy) | (Condition) | (Action) |
|---|---|---|
| Default | — | Assign VLAN 1 |
| Policy 1 | Hyper Context Label 1 | Assign VLAN 10 |
| Policy 2 | Hyper Context Label 2 | Assign VLAN 20 |

These three policies (i.e., Default, Policy 1 and Policy 2) may comprise a group of policies that can be specific to a wireless SSID.

When computing device 103 attempts to connect to computer network 116, computing device 103 may initially be assigned by default to VLAN 1. This VLAN assignment is not associated with or assigned from any policy. Communication data associated with computing device 103 (e.g., included in span traffic 120) is received by hyper context network sensor 112. This communication data is transmitted to hyper context cloud server 110, which determines a hyper context associated with computing device 103. Hyper context cloud server 110 may then access Policy 1 responsive to the hyper context. Hyper context cloud server 110 may then request cloud controller 108 to assign a VLAN to computing device 103. Policy 1 is then enforced on computing device 103 by cloud controller 108 via access point 104 or via network switch 106. Enforcing Policy 1 is accomplished by disconnecting computing device 103 from computer network 116 and having computing device 103 reconnect to computer network 116. In some aspects, computing device 103 may be authenticated by computer network 116 prior to the disconnecting. In this case, the disconnection process de-authenticates computing device 103. In other aspects, microsegmentation is independent of authentication.

When computing device 103 attempts to reconnect to computer network 116, access point 104 segments computing device 103 onto VLAN 10 based on Policy 1 being associated with computing device 103. In some aspects, computing device 103 may be reauthenticated during the reconnection process. Network switch 106 may perform functions similar to access point 104 for a computing device connected directly to network switch 106 (e.g., computing device 102).

As another example, computing device 103 is connected to or attempts to connect to computer network 116 via access point 104 and network switch 106. Hyper context network sensor 112 observes span traffic 120 associated with communication on network 116. Hyper context network sensor 112 transmits data associated with span traffic 120 to hyper context cloud server 110. Hyper context cloud server 110 is configured to assign a hyper context to a computing device responsive to analyzing the data associated with span traffic 120 received from hyper context network sensor 112. In an aspect, network switch may be a trunk port, with a native VLAN ID of 1, and additional allowed VLANs with ID 10, 70, and 80.

In an aspect, hyper context cloud server 110 is configured to access a policy associated with a VLAN identifier associated with computer network 116. A policy for compliance is generated by hyper context cloud server 110 as follows:

| (Condition) | (Action) | (Type) |
|---|---|---|
| Ownership = managed AND Risk Not Equals High AND Compliant = True | Segment Name: Compliant | Network Access Controller (NAC) |
| Ownership = managed AND Compliant = False | Segment Name: Non-Compliant | Radius Cloud Server |

In an aspect, a policy can be enforced using a cloud-based Radius Server, where the cloud-based Radius Server acts as a cloud controller. Hyper context cloud server 110 communicates these one or more policies to cloud controller 108. Cloud controller 108 uses these policies to generate the following VLAN policy and label set:

| (Label) | (MAC Addresses) | (Action) |
|---|---|---|
| Default | MAC1, MAC2 | VLAN 1 |
| Compliant | MAC3, MAC4 | VLAN 70 |
| Non-compliant | MAC5, MAC6 | VLAN 80 |

In an aspect cloud controller 108 may be configured with the following settings:

| (RADIUS Server) | (VLANs) | (VLAN Type) |
|---|---|---|
| Radius Cloud Server | Dynamic: 10, 70, 80 Static: 1 | Tunnel Private Group ID |

Cloud controller 108 segments the computing device onto the VLAN based on the VLAN identifier. The process of segmenting is performed by DHCP server 114 via, for example, using a dynamic host configuration protocol (DHCP). DHCP server 114 is configured to access DHCP pool 118 containing a list of all VLANs associated with computer network 116. For example, DHCP server 114 might include the following VLAN assignment:

| (VLAN + Pool Name) | (Subnet) |
|---|---|
| VLAN 10 | 10.1.10.1-10.1.10.100 |
| VLAN 70 | 10.1.70.1-10.1.70.100 |
| VLAN 80 | 10.1.80.1-10.1.80.100 |

In an aspect, a VLAN associated with a VLAN assignment request is matched with a configured pool, and an IP address is assigned from a corresponding subnet.

Suppose a managed computing device with a risk factor that is not high attempts to connect to computer network 116. Hyper context cloud server 110 analyzes a hyper context associated with the computing device. If the hyper context is associated with the computing device being compliant to a set of conditions associated with computer network 116, then the computing device is labeled as "compliant." The computing device is then placed on VLAN 70 by cloud controller 108.

On the other hand, if a managed computing device is labeled as "non-compliant" for not being compliant to the set of conditions associated with computer network 116 (as determined by hyper context cloud server 110), then the computing device is placed on VLAN 80 by cloud controller 108. In a sense, VLAN 80 may be considered as a quarantine VLAN, where non-compliant computing devices are assigned.

FIG. 1B is a block diagram depicting an example computer architecture of hyper context cloud server 110. In an aspect, hyper context cloud server 110 includes a computing system 122 and a hyper context database 124. Computing system 122 is configured to receive and analyze data associated with span traffic 120 (i.e., span traffic meta data). Span traffic 120 is received by computing system 122 from hyper context network sensor 112.

In an aspect, computing system 122 is configured to access a hyper context set 132 contained in hyper context database 124. Computing system 122 locates a hyper context 128 associated with a computing device (e.g., computing device 102 or 103) connected to or attempting to connect to computer network 116. In aspect, hyper context 128 is located in and/or derived from hyper context set 132. Computing system 122 may assign hyper context 128 to the computing device. In one aspect, hyper context set 132 may also include one or more policies associated with segmenting a computing device (e.g., computing device 103) onto a VLAN (or segment) associated with computer network 116. In some aspects, each policy is associated with a specific hyper context.

FIG. 1C is a block diagram depicting an example computer architecture of hyper context cloud server 110. In an aspect, hyper context cloud server 110 includes computing system 122, hyper context database 124, and a policy database 126. Computing system 122 accesses hyper context set 132 in hyper context database 124 and locates hyper context 128 in hyper context set 132.

In an aspect, policy database 126 may store one or more policies associated with segmenting a computing device (e.g., computing device 103) onto a VLAN (or segment) associated with computer network 116. A policy 130 is accessed from policy database 126 by processing system 122. Policy 130 may be enforced on a computing device by cloud controller 108.

FIG. 1D is a block diagram depicting an example computer architecture of a dynamic microsegmentation system 144. In one aspect, dynamic microsegmentation system 144 includes a network 134. Network 134 further includes hyper context network sensor 112, a network traffic controller 140, and a segment assignment server 138. Dynamic microsegmentation system 144 also includes hyper context cloud server 110, and cloud controller 108. A computing device 142 may be associated with computer network 134.

In an aspect, computing device 142 is connected to or attempts to connect to computer network 134 via network traffic controller 140. Network traffic controller 140 enables an interface of a computing device to computer network 134 via an appropriate communication protocol such as Ethernet, USB, as Wi-Fi, Bluetooth, Bluetooth Low Energy (BLE), ZigBee, Long-Term Evolution (LTE), Lorawan, zwave, etc. In some aspects, network traffic controller 140 may function similarly to a network switch.

Computing device 142 communicates over computer network via network traffic controller 140. In an aspect, span traffic 120 corresponding to communication associated with computing device 142 or any other computing device connected to or attempting to connect to computer network 134 is received by hyper context network sensor 112. Hyper context network sensor 112 transmits data associated with span traffic 120 to hyper context cloud server 110. Hyper context cloud server 110 is configured to assign a hyper context to a computing device responsive to analyzing the data associated with span traffic 120 received from hyper context network sensor 112.

In an aspect, hyper context cloud server 110 is configured to access a policy associated with a segment identifier associated with computer network 134. Cloud controller 108 receives information associated with the segment identifier, and segments the computing device onto the segment based on the segment identifier. Segmenting can be implemented by segment assignment server 138. Segment assignment server 138 is configured to access a segment pool 136 containing a list of all segments associated with computer network 134.

Network 134 represents a general network comprised of computing devices that are internetworked using any appropriate combination of wireless and wired networking protocols. A "segment" is defined as any subsection, subnetwork, or subset of network 134 (e.g., a VLAN or a subnet). Microsegmentation systems 100 and 144 essentially function to segment a computing device joining the respective network onto an appropriate or relevant segment.

Contemporary segmentation systems and methods use network access control (NAC) to perform segmentation of a computing device onto a desired segment. However, NAC-based deployments are associated with the following disadvantages:

NAC deployments are complicated to manage and maintain.

A NAC cannot segment based on risk & compliance posture of a computing device as they do not maintain these computing devices.

A NAC does not have an entire device hyper context like ownership, interface correlations, and so on. This limits the NAC in segmentation decisions.

Hence, it is highly desirable to provide segmentation solutions which includes entire device context in a NAC-less fashion, as described herein.

Trust but verify is one of the primary principles of security in a traditional enterprise, with the mandate for IT organization to provide a safe environment while ensuring ease of use and access to the employees and devices. However, with the recent explosion in connected smart devices, advancements in technology/software and evolution of computing devices, this leaves the company wide open to both insider and outside attacks.

With traditional perimeter-based and endpoint security, enterprises protect the entry into and egress from the network, define and group computing devices/users into subnets/VLANs using a specific set of usually static rules, use authentication mechanisms centered around users, and install agents to detect and prevent malware. These methods, though necessary, are not enough to protect against the threats posed by unmanaged computing devices, credential misuse, IoT devices, wrong configuration, insider mal-intent, and lateral movement of threats once they enter the system. There are many publicly-known instances of costly breaches that have occurred at well-known large enterprises for each one of the threats mentioned above and this is only increasing each year.

Thus, a zero-trust way of implementing security is gaining strong momentum. Zero Trust is rooted in the principle of "Always verify, never trust". This principle of Zero Trust is designed to address security, access privileges and control in the network by leveraging micro-segmentation and performing granular access enforcement based on users, computing devices, data and location properties.

Zero trust means that each user, computing device, data flow, and location should be monitored/observed continuously, even those which have authenticated correctly—because credentials can be stolen. Monitoring and observation may involve computing device fingerprinting and risk profiling to get an accurate behavioral map, with access to other resources dependent on the outcome of this mapping and observations.

To accomplish this, the following aspects can be utilized:

Hyper Context: Deep context about computing devices, resources and users in and around the network.

Microsegmentation: Ability to dynamically micro segment computing devices based on the above context and geo location.

Dynamic Control: Dynamically control access to these computing devices and users have, to other resources in the network based on context and real-time threat assessment.

Automation: Automation to handle computing devices at an IoT scale via a policy engine driven by a strong understanding of the enterprises business requirements.

These different concepts are further described below.

Hyper Context:

With an explosion in the number of electronic (computing) devices that are now connected via multiple communication protocols such as Wi-Fi, ZigBee, Bluetooth, BLE, and cellular networks, fingerprinting the computing device needs to be done based on the unique characteristics of the computing device across multiple dimensions. These dimensions measured include multiple layers, including hardware, software, logical, functional, and other operational characteristics. As such, information about computing devices can be collected, including: RF, each physical interface, protocol, traffic flow, and application. The collected information can be combined with organizational information from a configuration management database (CMDB), other tools like mobile device management (MDM), endpoint detection and response (EDR), vulnerability assessment, firewall, times of operation and location amongst others. In some aspects, hyper context network sensor 112 performs information collection and/or combination. This collected and/or combined information is then learned by supervised and unsupervised machine learning algorithms that generate rule sets to reveal patterns embedded in these measurements. In some aspects, these algorithms and rule sets are computed on computing system 122. These algorithms and rule sets generate models and signatures for each computing device which includes the following information called "Hyper Context."

Association of the physical interfaces of the computing device and the spectrum of operation of each interface.

Type, Category of the computing device and related information.

Operating system, patches (patch level), services and applications running on the computing device.

Functionality or the "purpose in life" of the computing device.

Micro location of the computing device, its mobility patterns and times of visibility.

Ownership information of the computing device

Control information (automatic vs user-controlled) associated with the networked computing device.

Users on the computing device.

Behavior based analysis of all the data transmissions across all protocols and spectrums.

Risk and vulnerability information, other information collected by other tools used.

Hyper context database 124 can be populated with an exhaustive list of hyper context properties in the form of hyper context set 132.

Collected data and, for example, intermediate insights can then be used to develop one or more of: a device identity fingerprint, device group fingerprints, or device operational fingerprints. Developed fingerprints can be used to more accurately recognize a computing device, group devices of same kind together, and establish a computing device's normal operation and function. These developed fingerprints can then be used to establish an effective zero trust architecture by:

Identifying new computing devices seen in the organization automatically.

Identifying anomalous behavior in the computing devices whose fingerprints have been collected.

Offering insights about the risks, threats associated and best practices.

Generating labels based on the collected information, intermediate insights and final fingerprints and expose these labels to the micro-segmentation and policy layers.

* Micro-Segmentation

The field of network segmentation has relied on NAC, VLANs, authentication, and access control lists (ACLs) for creating and enforcing network segmentation for years.

However, these offer only a coarse-grained segmentation that is hard to manage and easy to break.

Microsegmentation is a relatively more granular and dynamic method of creating secure zones. Microsegmentation effectively utilizes deeper context of computing devices and users, while allowing enterprises to isolate workloads, computing devices, and users from one another and secure them individually.

By defining a hyper context associated with one or more computing devices, microsegmentation can be implemented. Network Operations teams can tailor security settings and create dynamic access control policies that limit network and application flows between workloads. Security settings and access control policies can be based on authentication, traffic and application information as well as a combination of physical properties like device type, interface and functionality; logical properties like ownership and control; by threat and risk assessment; and by dynamic properties such as location and time.

In a zero-trust security model, a company could set up a policy, for example, that states that medical devices owned by the enterprise can only talk to other medical devices owned by the enterprise, or a policy that finance department assets can only communicate to sanctioned applications and sanctioned internal resources. Thus, irrespective of the authentication used, or the network segment that the computing device is connected to, a more granular access control based on many different computing device properties can be enforced, effectively implementing a zero-trust architecture. Furthermore, if a computing device or workload moves to a different location, the security policies and attributes move with it.

Microsegmentation includes the following benefits to a network:
 Reducing attack surface by preventing lateral movement of malware and threats.
 Improving breach containment. Without a structured microsegmentation approach in place, tactics such as probing for vulnerabilities, installing malware, and establishing unauthorized communication backchannels can have a much higher success rate.
 Providing stronger regulatory compliance posture. Microsegmentation can completely isolate systems that are subject to regulations from the broader IT infrastructure. Microsegmentation can also tightly govern how systems within regulatory scope communicate with each other, reducing the risk of non-compliant usage. The added visibility that micro-segmentation solutions provide also makes supporting regulatory audits easier.

* Dynamic Control

A dynamic Zero-trust architecture is beneficial, especially when the number of computing devices accessing a network is growing exponentially. As computing devices enter and leave a network, the access these computing devices and users have to other resources in the network, based on context and real time threat assessment, can be dynamically controlled. Static rules based on L2-L3 based segmentation, ACLs, and user authentications are cumbersome and can be easily overcome. For example, if any audio/video conferencing devices are statically segmented into a specific subnet, it is possible to plug in a laptop in the same subnet and sniff and snoop on the session initiation protocol (SIP) communications. It is also possible to make a mistake and connect a conferencing device into other subnets. A dynamic approach can entail a learning engine and a policy engine configured to determine that a computing device is a video conferencing device, and automatically route the computing device an appropriate or relevant VLAN with correct access permissions. In an aspect, the learning engine and policy engine may be implemented on a computing system such as computing system 122. On the flip side, any computing device on the subnet that does not match the profile of a conferencing device or having anomalous behavior can be quarantined from the other computing devices in that VLAN.

Computing devices and associated users are now mobile, and zero-trust architecture can also adapt to different locations as well as micro location within a specific location. As a computing device moves between floors or between buildings, the computing device can be provided with appropriate security and access permissions. Thus, the perimeter, access control and quarantining of computing devices can be software-defined and dynamic. The zero-trust architecture can continuously monitor and adapt to the current state of the computing device, the network and an associated threat exposure, as opposed to being defined as a set of static rules.

Figure 2:
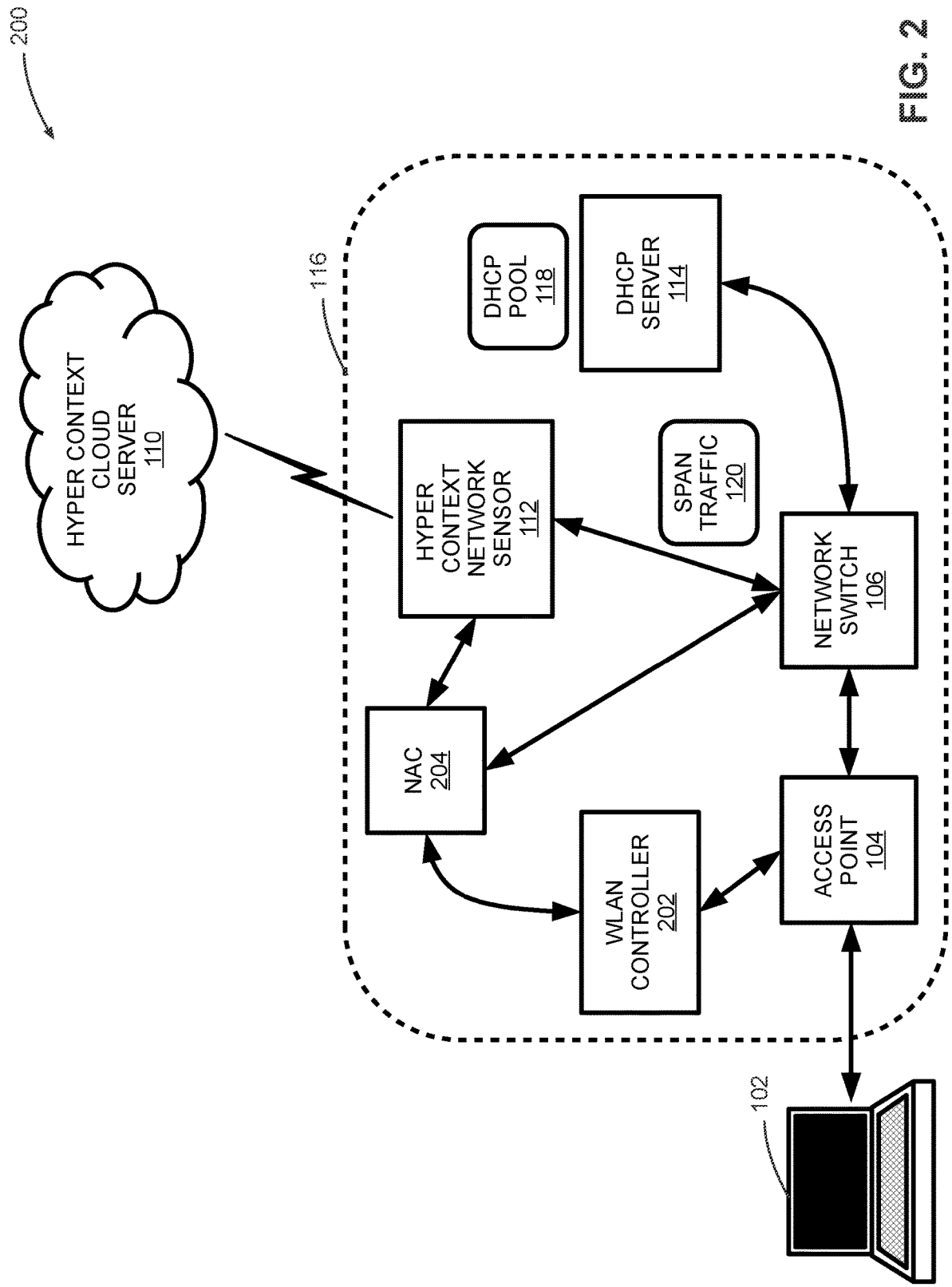
FIG. 2 is a block diagram depicting an example computer architecture of a dynamic microsegmentation system.

FIG. 2 is a block diagram depicting an example computer architecture of a dynamic microsegmentation system 200. In an aspect, dynamic microsegmentation system 200 includes hyper context cloud server 110, computer network 116 and computing device 102. Computer network 116 further includes hyper context network sensor 112, network switch 106, access point 104, DHCP server 114, WLAN controller 202, and NAC 204.

In an aspect, computing system 102 is connected to or attempts to connect to computer network 116 via access point 104 and network switch 106. Hyper context network sensor 112 observes span traffic 120 associated with communication on network 116. Hyper context network sensor 112 transmits data associated with span traffic 120 to hyper context cloud server 110. Span traffic 120 may be associated with computing device 102 or any other computing device on computer network 116. Hyper context cloud server 110 is configured to assign a hyper context to a computing device responsive to analyzing the data associated with span traffic 120 received from hyper context network sensor 112. For example, if span traffic 120 is associated with computing device 102, then hyper context cloud server 110 assigns a hyper context to computing device 102. In an aspect, network switch 106 may be a trunk port, with a native VLAN ID of 1, and additional allowed VLANs with ID 10, 70, and 80.

In an aspect, hyper context cloud server 110 is configured to access a policy associated with a VLAN identifier identifying a VLAN on computer network 116. Hyper context cloud server 110 assigns a VLAN to the computing device based on the policy. The process of segmenting is performed by DHCP server 114 via, for example, DHCP. DHCP server 114 is configured to access DHCP pool 118 containing a list of all VLANs associated with computer network 116. For example, DHCP server 114 might include the following VLAN assignment:

| Pool Name | (Networks) |
| --- | --- |
| VLAN 10 | 10.1.10.1-10.1.10.100 |
| VLAN 70 | 10.1.70.1-10.1.70.100 |
| VLAN 80 | 10.1.80.1-10.1.80.100 |

In an aspect, NAC 204 is a network access controller that is configured to implement network access control (NAC) associated with computer network 116. NAC 204 is communicatively coupled (i.e., connected to) WLAN controller 202, network switch 106, and hyper context network sensor 112. In an aspect, NAC 204 may function as a RADIUS Server, and WLAN controller 202 is correspondingly configured as follows:

| RADIUS Server) | (VLANs) | (VLAN Type) |
|---|---|---|
| NAC | Dynamic: 1, 70, 80<br>Static: 1 | Tunnel Private<br>Group ID |

WLAN controller 202 is a wireless LAN controller that may be associated with two types of VLANs—static and dynamic. VLAN ID 1 is both static and dynamic.

The associated configuration for NAC 204 is defined as:

| (Policy Tags) | (RADIUS Attribute) | (MAC Address) |
|---|---|---|
| Default | VLAN: 1 | Default VLAN |
| Compliant | VLAN: 70 | Dynamically Populated |
| Non-compliant | VLAN: 80 | Dynamically Populated |

The table above describes a set of policies along with associated VLANs and MAC addresses for each policy as defined in NAC 204. A default computing device (e.g., a new computing device on the network) is assigned to a default VLAN (e.g., VLAN 1). A computing device that has been verified to be compliant is assigned to VLAN 70 with an appropriate IP address in the range 10.1.70.1-10.1.70.100. On the other hand, a non-compliant computing device is assigned to VLAN 70 with an appropriate IP address in the range 10.1.80.1-10.1.80.100.

In an aspect, a policy for VLAN assignment is generated by hyper context cloud server 110 as follows:

| (Condition) | (Action) | (Type) |
|---|---|---|
| Ownership = managed<br>AND Risk Not Equals<br>High AND Compliant =<br>True | Segment Name: Compliant | NAC |
| | | NAC |
| Ownership = managed<br>AND Compliant = False | Segment Name: Non-Compliant | |

Suppose a managed computing device with a relatively low risk factor attempts to connect to computer network 116. Hyper context cloud server 110 analyzes a hyper context associated with the computing device. If the hyper context is associated with the computing device being compliant to a set of conditions associated with computer network 116, then the computing device is labeled as "compliant." The computing device is then placed on VLAN 70 by NAC 204.

On the other hand, if a managed computing device is labeled as "non-compliant" for not being compliant to the set of conditions associated with computer network 116 (as determined by hyper context cloud server 110) (or is otherwise of relatively higher risk), then the computing device is placed on VLAN 80 by NAC 204. In a sense, VLAN 80 may be considered as a quarantine VLAN, where all non-compliant computing devices are placed.

Figure 3:
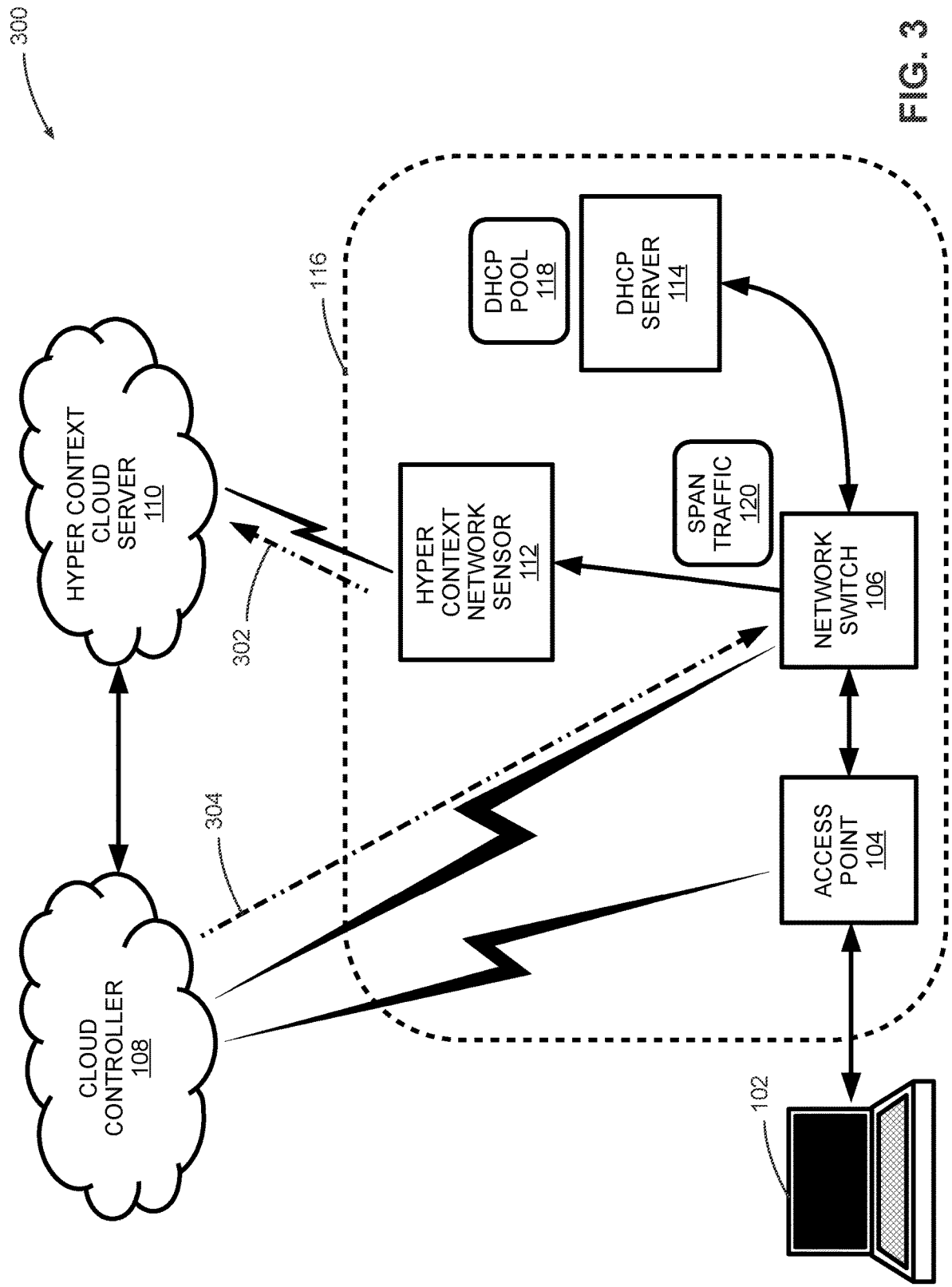
FIG. 3 is a block diagram depicting an example computer architecture of a dynamic microsegmentation system.

FIG. 3 is a block diagram depicting an example computer architecture of a dynamic microsegmentation system 300. In an aspect, dynamic microsegmentation system 300 includes cloud controller 108, hyper context cloud server 110, computer network 116 and computing device 102. Computer network 116 further includes hyper context network sensor 112, network switch 106, access point 104, DHCP server 114, and network switch 106.

In an aspect, computing system 102 is connected to or attempts to connect to computer network 116 via access point 104 and/or network switch 106. Hyper context network sensor 112 observes span traffic 120 associated with communication on network 116. Hyper context network sensor 112 transmits data associated with span traffic 120 to hyper context cloud server 110. In an aspect, this data transmission is along a unidirectional communication channel 302. Hyper context cloud server 110 is configured to assign a hyper context to a computing device responsive to analyzing the data associated with span traffic 120 received from hyper context network sensor 112. In an aspect, network switch may be a trunk port, with a native VLAN ID of 1, and additional allowed VLANs with ID 10, 70, and 80.

In an aspect, hyper context cloud server 110 is configured to access a policy associated with a VLAN identifier identifying a VLAN on computer network 116. A policy for VLAN assignment is generated by hyper context cloud server 110 as follows:

| (Condition) | (Action) | (Effect) |
|---|---|---|
| Ownership = managed<br>AND Risk Not Equals<br>High AND Compliant =<br>True | Segment Name: Compliant<br>Segment Name: Non-<br>Compliant | VLAN 70<br>VLAN 80 |
| Ownership = managed<br>AND Compliant = False | | |

Hyper context cloud server 110 configures these one or more policies on cloud controller 108. Cloud controller 108 uses these policies to generate the following policy and label set:

| (Label) | (MAC Addresses) | (Policy) |
|---|---|---|
| Default<br>Compliant | MAC1, MAC2<br><Populated dynamically based<br>on policies generated by hyper<br>context cloud server 110> | VLAN 1<br>VLAN 70 |
| Non-compliant | <Populated dynamically based<br>on policies generated by hyper<br>context cloud server 110> | VLAN 80 |

In the above set, MAC1 and MAC2 are MAC addresses associated with VLAN 1, a native VLAN associated with network switch 106. Cloud controller 108 segments the computing device onto the VLAN based on the MAC address and the policy. In an aspect, this enforcement is performed along a unidirectional communication channel 304.

In an aspect, communication between cloud controller 108 and access point 104 includes:
 [0] Configuration Step: (performed one time)
  [a] HyperContext Policy in HyperContext Cloud:
   Policy Name: Compliant Policy
   Condition: ownership=corporate AND services_active=anti-virus
   Action: Set Label as Compliant
  [b] Cloud controller (e.g., cloud controller 108):
   Label: Compliant
   Devices: device1, device2, device3
   Action: Set VLAN 70

[c] DHCP Server (e.g., DHCP server 114):
  Pool Name: VLAN 70
  IP Address: 10.1.70.0-10.1.70.255
Dynamic/on-the-fly communication may include:
[1] Hyper Context Cloud server 110 applies the policy for a given device N and determines that the action is to segment the device onto Compliant label
[2] Hyper context cloud server 110 sends the below information to the cloud server via API:
  Add: device N
  Label: Compliant
[3] Cloud Controller 108 adds computing device N to the list
  Label: Compliant
  Devices: computing device1, computing device2, computing device3, computing device N
  Action: Set VLAN 70
[4] Cloud Controller 108 calls, via an API, all access points and network switches to assign VLAN 70 for traffic from device N
  Set VLAN 70 device N
[5] Hyper Context Cloud server 110 may also send a change of authentication (CoA) or port bounce to computing device N using the cloud controller 108.
[6] Next time, computing device N access the network, the access point or network switch will set VLAN, 70 and DHCP server 114 will assign IP address from the new range.

The process of segmenting is performed by DHCP server 114 via, for example, using DHCP. DHCP server 114 is configured to access DHCP pool 118 containing a list of all VLANs associated with computer network 116. For example, DHCP server 114 might include the following VLAN assignment:

| Pool Name | (Networks) |
|---|---|
| VLAN 10 | 10.1.10.1-10.1.10.100 |
| VLAN 70 | 10.1.70.1-10.1.70.100 |
| VLAN 80 | 10.1.80.1-10.1.80.100 |

Suppose a managed computing device with a risk factor that is not high attempts to connect to computer network 116. Hyper context cloud server 110 analyzes a hyper context associated with the computing device. If the hyper context is associated with the computing device being compliant to a set of conditions associated with computer network 116, then the computing device is labeled as "compliant." The computing device is then placed on VLAN 70 by cloud controller 108.

On the other hand, if a managed computing device is labeled as "non-compliant" for not being compliant to the set of conditions associated with computer network 116 (as determined by hyper context cloud server 110), then the computing device is placed on VLAN 80 by cloud controller 108. In a sense, VLAN 80 may be considered as a quarantine VLAN, where all non-compliant computing devices are placed.

Figure 4:
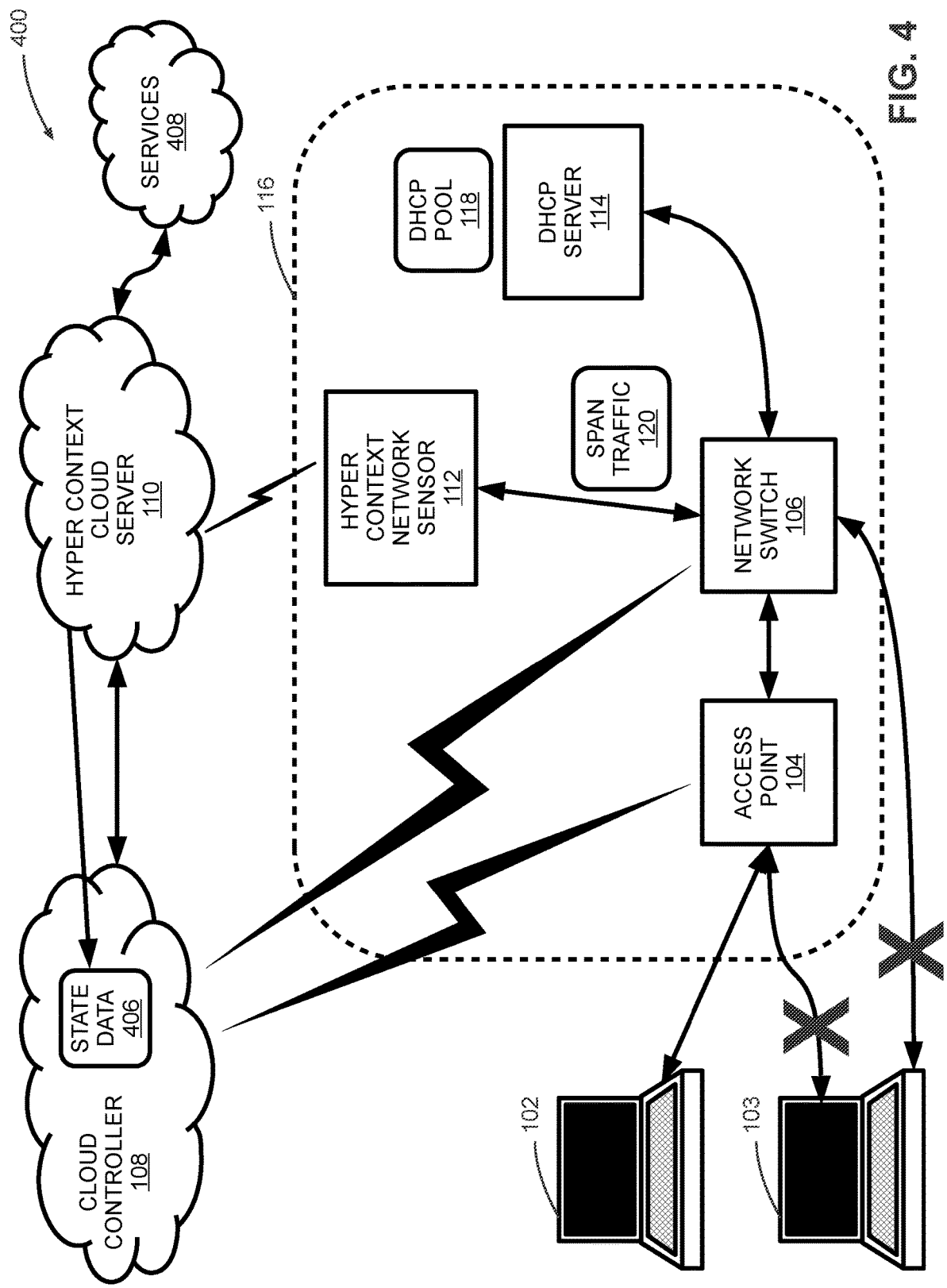
FIG. 4 is a block diagram depicting an example computer architecture of a dynamic microsegmentation system.

FIG. 4 is a block diagram depicting an example computer architecture of a dynamic microsegmentation system 400. In an aspect, dynamic microsegmentation system 400 includes computer network 116, cloud controller 108, hyper context network server 110, and services 408. Computer network 116 further includes access point 104, network switch 106, and DHCP server 114. Computing system 102 is connected to or attempts to connect to computer network 116 via access point 104. Computing system 103 is connected to or attempts to connect to computer network 116 via access point 104 or via network switch 106.

Hyper context network sensor 112 receives or monitors span traffic 120 and transmits span traffic metadata to hyper context cloud server 110. In an aspect, span traffic 120 may be associated with communication data corresponding to computing devices 102 and 103. Hyper context cloud server 110 is configured to assign a hyper context to a computing device responsive to analyzing the data associated with span traffic 120 received from hyper context network sensor 112.

In an aspect, hyper context cloud server 110 is configured to access a policy associated with a VLAN identifier identifying a VLAN on computer network 116. Cloud controller 108 receives information associated with the VLAN identifier, segments the computing device onto the VLAN based on the policy and the VLAN identifier. The process of segmenting is performed by DHCP server 114 via, for example, using DHCP. DHCP server 114 is configured to access DHCP pool 118 containing a list of all VLANs associated with computer network 116.

In an aspect, services 408 may include any combination of services such as antivirus services, asset management services, and IT management services. In an aspect, a policy engine associated with hyper context cloud server 110 may include the following services-based policy listing:

| (Condition) | (Action) |
|---|---|
| Ownership = MANAGED AND Antivirus Services = TRUE | Segment: Compliant |
| Ownership = MANAGED AND Antivirus Services = FALSE | Block |

A hyper context associated with a computing device may include properties associated with services 408, such as compliance with a particular API cloud service. For example, a computing device is segmented either as compliant if antivirus services returns a flag of TRUE associated with the computing device, or blocked if antivirus services returns a flag of FALSE associated with the computing device.

The action table above is populated responsive to the following Device Management and Services State associated with services 408 (or any other integration service):

| (Device) | (Management State) | (Services State) |
|---|---|---|
| Client1 (Computing device 102) | Managed (Asset Management Services) | Antivirus Services: True<br>IT Management Services: False |
| Client2 (Computing device 103) | Managed (Asset Management Services) | Antivirus Services: False<br>IT Management Services: False |

Both Client1 (i.e., computing device 102) and Client2 (i.e., computing device 103) are managed by asset management services in this example. IT management services returns a flag of "False" for both computing devices. Antivirus services returns a flag of "True" for Client1 and "False" for Client2. Based on these computing device states, Client1 is determined to be compliant, while Client2 is determined to be non-compliant, is blacklisted, and may be blocked. The compliance of Client1 and the non-compliance of Client2 are captured by hyper context cloud server 110, and written to cloud controller 108 as state data 406. State data 406 may be presented in the following format:

| (Type) | (Name) | (Clients) |
|---|---|---|
| Label | Compliant | Client1 |
| Security | Blocked | Client2 |

Cloud controller 108 enforces associated policies (e.g., compliant vs. blocked) onto computer network 116. Since Client1 is compliant, this computing device is allowed to connect to computer network 116 via access point 104. On the other hand, blacklisted Client2 is prevented from connecting to (i.e., joining) computer network 116 via either access point 104 or network switch 106.

Figure 5:
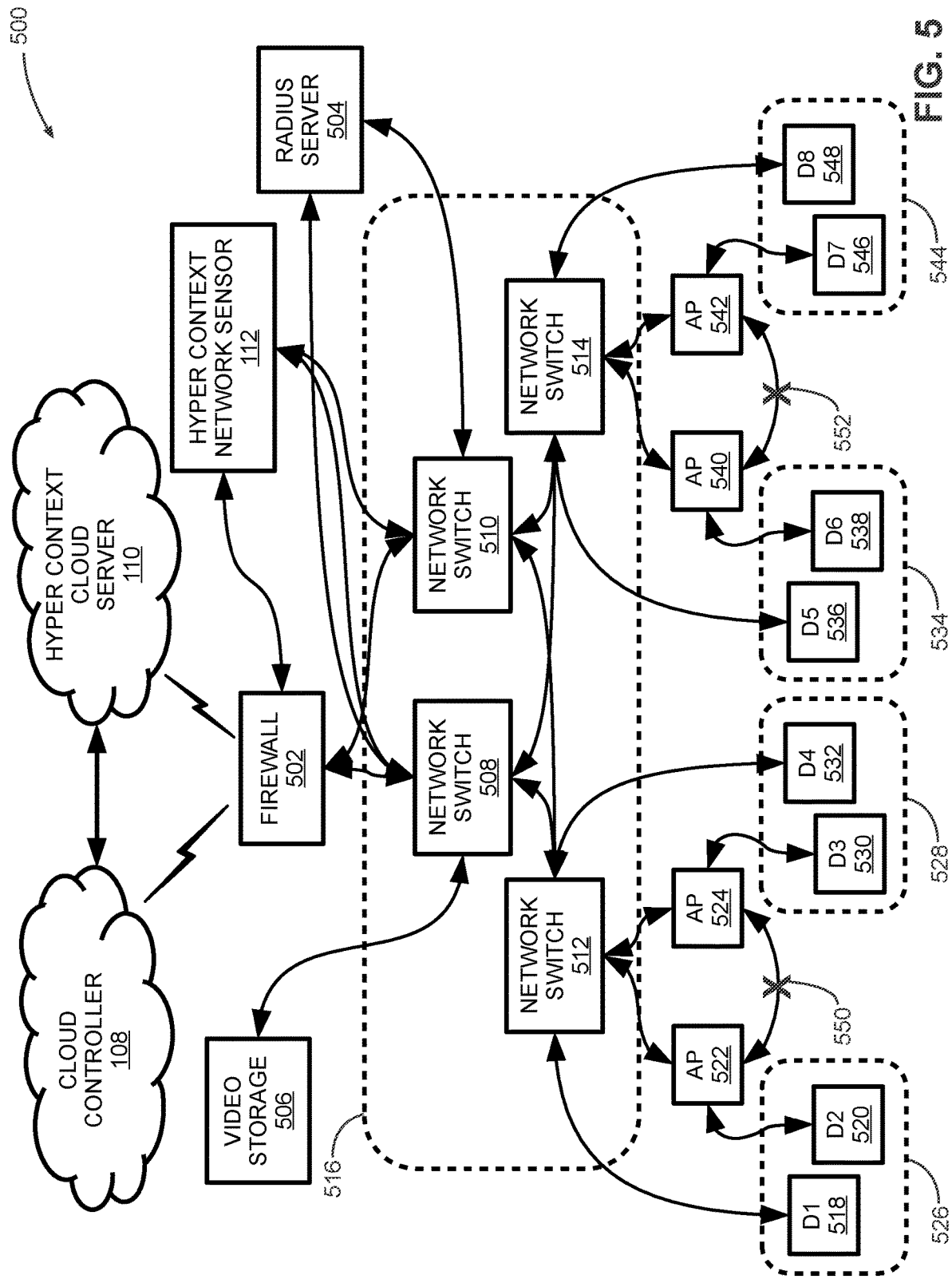
FIG. 5 is a block diagram depicting an example computer architecture of a dynamic microsegmentation system.

FIG. 5 is a block diagram depicting an example computer architecture of a dynamic microsegmentation system 500. In an aspect, dynamic microsegmentation system 500 includes cloud controller 108, hyper context cloud server 110, hyper context network sensor 112, a video storage 506, a firewall 502, a radius server 504, a computer network 516, access points AP 522, AP 524, AP 540, and AP 542, and virtual networks 526, 528, 534, and 544. Computer network 516 may further include network switches 508, 510, 512, and 514. Virtual network 526 may further include a computing device D1 518, and a computing device D2 520. Virtual network 528 may further include a computing device D3 530, and a computing device D4 532. Virtual network 534 may further include a computing device D5 536, and a computing device D6 538. Virtual network 544 may further include a computing device D7 546, and a computing device D8 548.

In an aspect, communication is not allowed between access points AP 522 and AP 524, as indicated by a blocked communication channel 550. Similarly, communication is not allowed between access points AP 540 and AP 542, as indicated by a blocked communication channel 552.

In an aspect, computing device D1 518 may be communicatively coupled directly to network switch 512 via, for example, an Ethernet connection. Computing device D2 520 may be communicatively coupled to network switch 512 via access point AP 522. Computing device D2 520 may be communicatively coupled to access point 522 via a Wi-Fi communication link.

In an aspect, computing device D4 532 may be communicatively coupled directly to network switch 512 via, for example, an Ethernet connection. Computing device D3 530 may be communicatively coupled to network switch 512 via access point AP 524. Computing device D3 530 may be communicatively coupled to access point 524 via a Wi-Fi communication link.

In an aspect, computing device D5 536 may be communicatively coupled directly to network switch 514 via, for example, an Ethernet connection. Computing device D6 538 may be communicatively coupled to network switch 514 via access point AP 540. Computing device D6 538 may be communicatively coupled to access point 540 via a Wi-Fi communication link.

In an aspect, computing device D8 548 may be communicatively coupled directly to network switch 514 via, for example, an Ethernet connection. Computing device D7 546 may be communicatively coupled to network switch 514 via access point AP 542. Computing device D7 546 may be communicatively coupled to access point 542 via a Wi-Fi communication link.

In an aspect, network switch 508 is independently communicatively coupled with network switches 510, 512 and 514; network switch 510 is independently communicatively coupled with network switches 512, 514 and 508; network switch 512 is independently communicatively coupled with network switches 514, 508 and 510; and network switch 514 is independently communicatively coupled with network switches 508, 510 and 512. In some aspects, network switch 508 is communicatively coupled to radius server 504, video storage 506 and, hyper context network sensor 112. As depicted, hyper context network sensor 112 is external to network 516. Network switch 510 may be communicatively coupled with radius server 504 and hyper context network sensor 112.

In an aspect, communication between network switch 508 and cloud controller 108, network switch and hyper context cloud server 110, and hyper context network sensor 112 occurs via firewall 502. In some aspects, firewall 502 is configured to monitor associated network communication traffic passing through firewall 502, and to provide network security to computer network 516.

In an aspect, computing device D1 518 through computing device D8 548 communicate over computer network 516. For example, computing device D1 518 may communicate with computing device D7 546 via network switch 512, network switch 514, and access point AP 542. Or, computing device D6 538 may read video data stored on video storage 506 via network switch 508, network switch 514, and access point AP 540.

In some aspects, hyper context network sensor 112 monitors or senses network communication traffic over computer network 116, and transmits span traffic metadata to hyper context cloud server 110. In an aspect, the span traffic metadata may be derived from span traffic corresponding to communication associated with computing devices D1 518 through D8 548. Hyper context cloud server 110 generates a hyper context for one or more of computing device D1 518 through D8 548, and transmits data associated with each hyper context to cloud controller 108. Cloud controller 108 generates a segment assignment policy for each hyper context, and enforces the policy onto an associated computing device via firewall 502. Radius server 504 functions similar to segment assignment server 138 or DHCP server 114, and assigns a network segment or VLAN respectively according to a policy.

Figure 6:
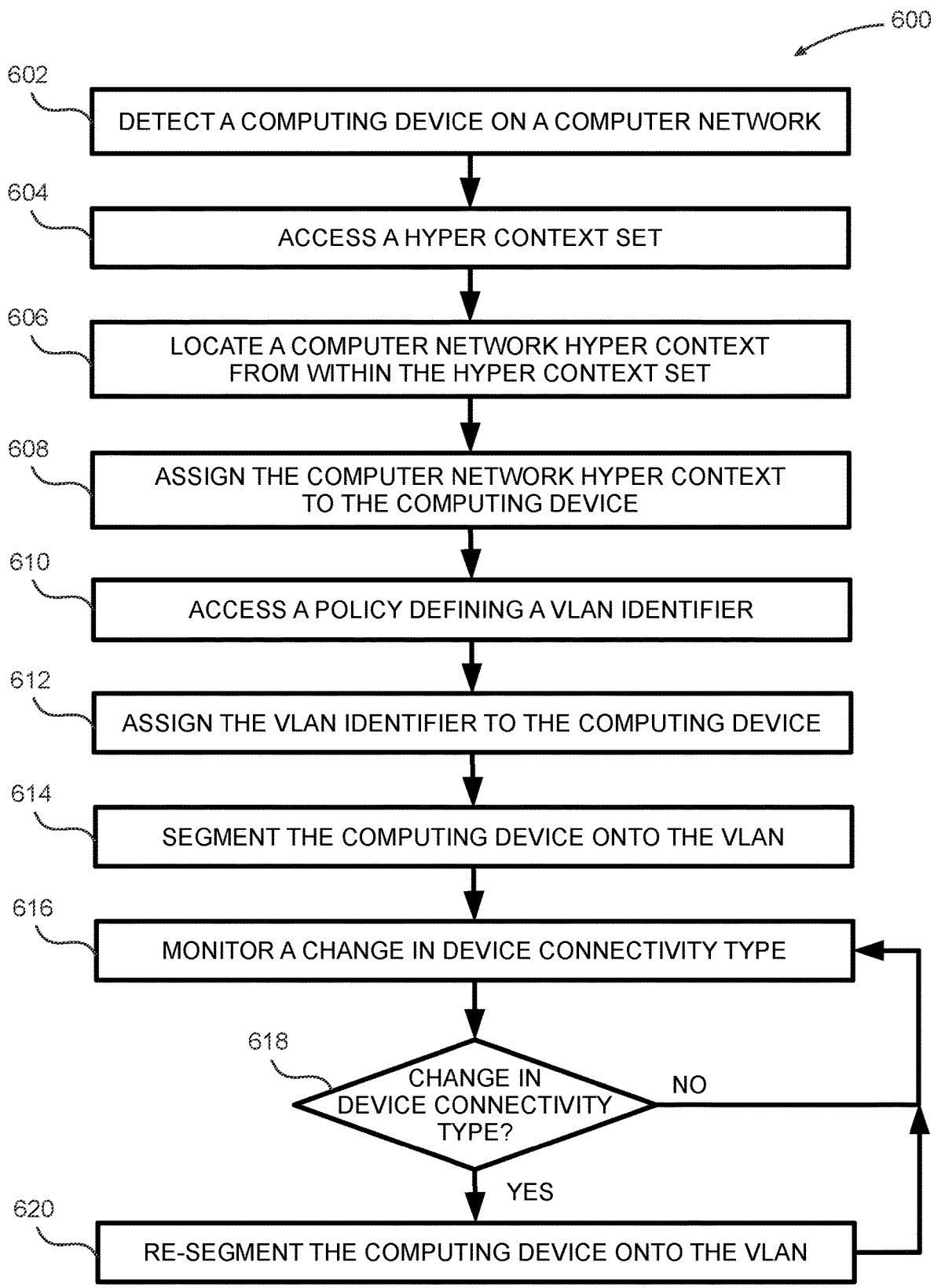
FIG. 6 is a flow diagram depicting an example method for segmenting a computing device onto a VLAN.

FIG. 6 is a flow diagram depicting an example method 600 for segmenting a computing device onto a VLAN.

Method 600 includes detecting a computing device on a computer network (602). In an aspect, hyper context network sensor 112 may detect a computing device (e.g., computing device 102) on computer network 116.

Method 600 includes accessing a hyper context set defining a plurality of possible computer network hyper contexts and corresponding policies (604). In an aspect, computing system 122 included in hyper context cloud server 110 accesses hyper context set 132 from hyper context database 124. In some embodiments, hyper context set 132 defines a plurality of possible network hyper contexts and corresponding policies.

Method 600 includes locating a network hyper context from within the hyper context set based on the network properties and computing device properties (606). In an aspect, corresponding policies of the hyper context set include definitions that enable one or more computing devices assigned the computer network hyper context to be segmented onto one or more specific VLANs. In an embodiment, hyper context cloud server 110 is configured to locate the network hyper context (i.e., hyper context 128) from hyper context set 132. Policy 130 represents the policies associated with the hyper context set.

Method 600 includes assigning a network hyper context to the computing device based on network properties and computing device properties associated with the computing device (608). For example, hyper context cloud server 110 may assign hyper context 130 to computing device 103 based on span traffic meta data associated with computing device 103.

Method 600 includes accessing a policy defining a VLAN identifier identifying a VLAN and corresponding to the computer network hyper context (610). In an aspect, policy 130 may be accessed by processing system 122. In another aspect, the policy may be accessed by cloud controller 108 responsive to receiving hyper context data from hyper context cloud server 110.

Method 600 includes assigning the VLAN identifier to the computing device (612). For example, the policy may include assigning VLAN 70 to computing device 103. This assignment process may be implemented by cloud controller 108, or by hyper context cloud server 110.

Method 600 includes segmenting the computing device onto the VLAN (614). In an aspect, this segmentation may be performed based on the VLAN identifier, by cloud controller 108 enforcing a policy onto computing device 103 via access point 104.

Method 600 includes monitoring a change in a connectivity associated with the computing device (616). Such a connectivity change could include, for example, a change from wireless connectivity to wired connectivity or vice versa. A connectivity change could also result due to a computing device moving from one physical location in an institute to another physical location in the institute. Such a change in connectivity could change the VLAN that the computing device is connected to. In an aspect, hyper context cloud server 110 monitors span traffic meta data received from hyper context network sensor 112 to monitor a change in connectivity associated with, for example, computing device 103.

Method 600 includes detecting a change in connectivity type utilized by the computing device (618). In an aspect, hyper context cloud server 110 is configured to detect a connectivity change in, for example, computing device 103 based on span traffic meta data associated with computing device 103. If no change in connectivity type is detected at 618, the method returns to 616.

On the other hand, if a change in connectivity type is detected at 618, then method 600 goes to a stage that includes re-segmenting the computing device onto the originally-assigned VLAN (620). In an aspect, this task may be performed by hyper context cloud server 110 and/or cloud controller 108. The method then returns to 616.

Figure 7:
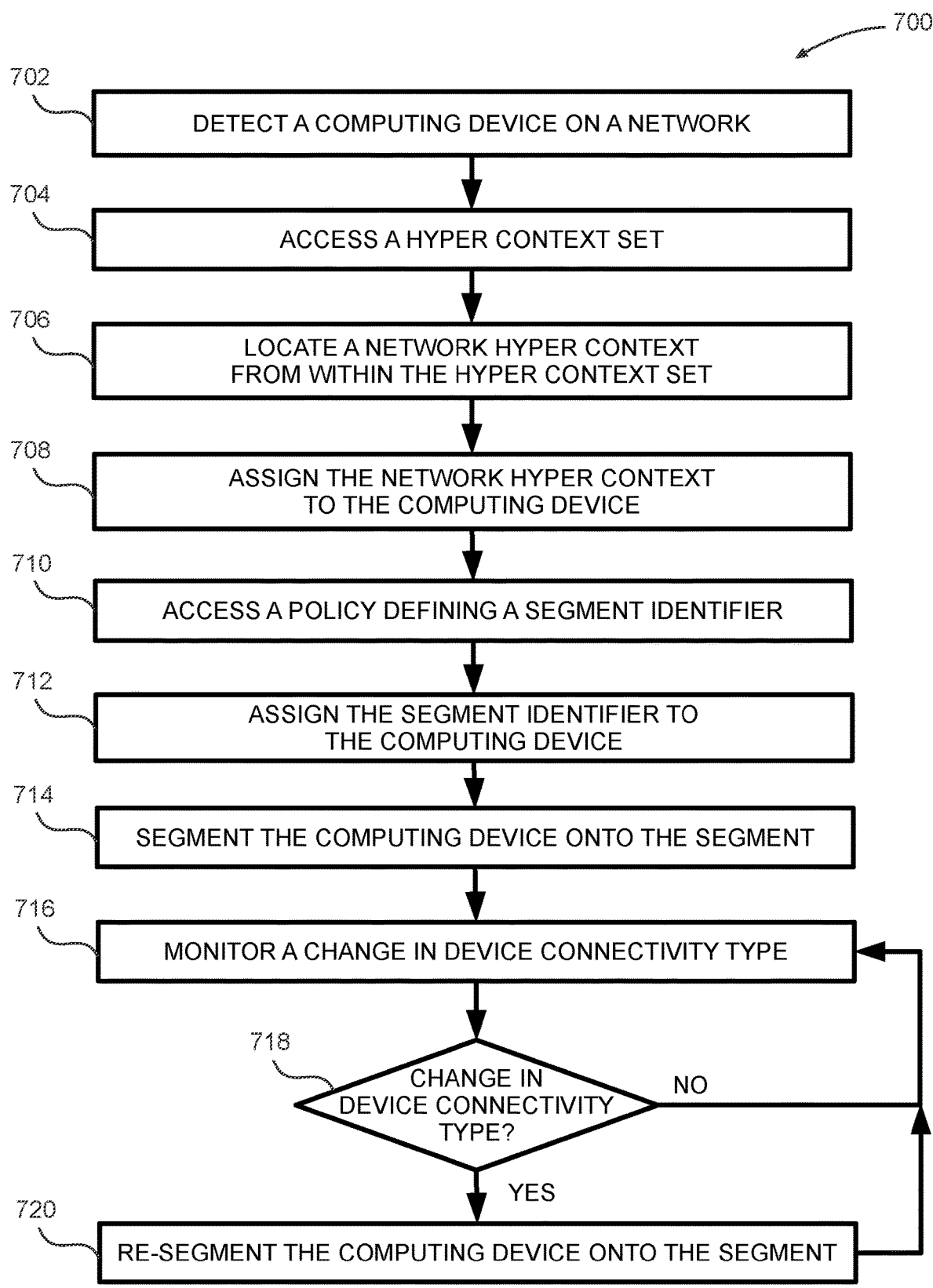
FIG. 7 is a flow diagram depicting an example method for segmenting a computing device onto a segment.

FIG. 7 is a flow diagram depicting an example method 700 for segmenting a computing device onto a segment.

Method 700 includes detecting a computing device on a computer network (702). In an aspect, hyper context network sensor 112 may detect a computing device (e.g., computing device 102) on computer network 116.

Method 700 includes accessing a hyper context set defining a plurality of possible computer network hyper contexts and corresponding policies (704). In an aspect, computing system 122 included in hyper context cloud server 110 accesses hyper context set 132 from hyper context database 124. In some embodiments, hyper context set 132 defines a plurality of possible network hyper contexts and corresponding policies.

Method 700 includes locating a network hyper context from within the hyper context set based on the network properties and computing device properties (706). In an aspect, corresponding policies of the hyper context set include definitions that one or more computing devices assigned the computer network hyper context are to be segmented onto one or more specific segments. In an embodiment, hyper context cloud server 110 is configured to locate the network hyper context (i.e., hyper context 128) from hyper context set 132. Policy 130 represents the policies associated with the hyper context set.

Method 700 includes assigning a network hyper context to the computing device based on network properties and computing device properties associated with the computing device (708). For example, hyper context cloud server 110 may assign hyper context 130 to computing device 103 based on span traffic meta data associated with computing device 103.

Method 700 includes accessing a policy defining a segment identifier identifying a segment and corresponding to the computer network hyper context (710). In an aspect, policy 130 may be accessed by processing system 122. In another aspect, the policy may be accessed by cloud controller 108 responsive to receiving hyper context data from hyper context cloud server 110.

Method 700 includes assigning the segment identifier to the computing device (712). For example, the policy may include assigning segment 70 to computing device 103. This assignment process may be implemented by cloud controller 108, or by hyper context cloud server 110.

Method 700 includes segmenting the computing device onto the segment (714). In an aspect, this segmentation may be performed, based on the segment identifier, by cloud controller 108 enforcing a policy onto computing device 103 via access point 104.

Method 700 includes monitoring a change in a connectivity associated with the computing device (716). Such a connectivity change could include, for example, a change from wireless connectivity to wired connectivity or vice versa. A connectivity change could also result due to a computing device moving from one physical location in an institute to another physical location in the institute. Such a change in connectivity could change the segment that the computing device is connected to. In an aspect, hyper context cloud server 110 monitors span traffic meta data received from hyper context network sensor 112 to monitor a change in connectivity associated with, for example, computing device 103.

Method 700 includes detecting a change in connectivity type utilized by the computing device (718). In an aspect, hyper context cloud server 110 is configured to detect a connectivity change in, for example, computing device 103 based on span traffic meta data associated with computing device 103. If no change in connectivity type is detected at 718, the method returns to 716.

On the other hand, if a change in connectivity type is detected at 718, then method 700 goes to a stage that includes re-segmenting the computing device onto the originally-assigned segment (720). In an aspect, this task may be performed by hyper context cloud server 110 and cloud controller 108. The method then returns to 716.

Methods 600 and 700 represent workflows associated with dynamic microsegmentation. In general, a computing device attempting to connect to a network is assigned to an appropriate segment such as a VLAN (i.e., segmented on the network) based on a hyper context associated with the computing device. This assignment process may be performed independently of an associated network authentication process, or may be included in an authentication process.

From a functional perspective, a dynamic microsegmentation system may have the following features:

High-level requirements: Computing devices or clients can be assigned to a particular segment (e.g., an IP subnet or a VLAN) based on policy in a "NAC-less" fashion. Device IP address assignment should change dynamically.

Hyper context cloud server hyper context policy: Create policies based on hyper-context conditions and allow actions with ability to segment using cloud controller 108.

Cloud controller segment/VLAN assignment policy: Create a policy with input as labels (e.g., client MAC Address) and actions which assign VLAN tags for client packets.

Cloud controller force reauthentication: When a computing device is assigned or removed from a VLAN assignment policy, the computing device should re-authenticate.

In one aspect, a computing device may be an IoT device such as a network printer that is assigned to an IoT device VLAN. Another example of a computing device is a laptop computer. Suppose that this laptop computer joins an associated computer network being classified as a corporate computing network, and assigned to a VLAN dedicated to corporate computing devices. It is assumed that a user associated with this computing device is mostly stationed in an office space. Now, if the user has to move into a conference room taking their laptop with them, the change in physical location may necessitate that the user logs on to the computer network using another access point or wired Ethernet connection. In this case, the microsegmentation system (i.e., a combination of hyper context network sensor 112, hyper context cloud server 110, and cloud controller 108) function to detect a change in the hyper context of the computing system and redirect the computing device to the original VLAN based on the hyper context associated with the computing device. This is an example of device re-segmentation.

This concept can be applied to other kinds of computing devices such as mobile phones, tablets, network printers, IoT devices, smart TVs, teleconferencing devices, medical devices, and so on. A segment may be defined based on criteria such as computing devices with cameras, phones, corporate computing devices with mandatory services, computing devices that need deeper inspection, etc. Using microsegmentation, a computing device can automatically be assigned to a relevant segment on an associated network as the computing device connects to the network (e.g., via an access point or a network switch). This process operates independently of access control, and circumvents a requirement for operations such as manual segment assignment, manual port or device configuration, and so on.

Other features associated with dynamic microsegmentation system 100 or 200 include:

Automated dynamic segmentation of computing devices based on their hyper context, irrespective of physical wiring, Wi-Fi access or credentials, for all devices in an organization.

Unmanaged devices connecting to corporate networks, both wired and wireless, are redirected to right segments or VLANs independent of authorization credentials. If a corporate computing device goes on a guest segment (e.g., guest VLAN or guest IP subnet), the computing device can be moved to back to a corporate segment (e.g., Corporate VLAN or a Corporate IP subnet). Or, if an unmanaged computing device is on a Corporate VLAN, it can be moved to a guest VLAN.

Corporate devices with incorrect and correct compliance postures are segmented into different VLANs.

IoT and non-802.1x-compliant devices connecting via wired and Wi-Fi can each individually be segmented into an appropriate VLAN.

Conferencing devices (e.g., Polycom devices) and cameras are assigned a separate segment or VLAN; other computing devices are not be allowed on these segments, and these computing devices should not be allowed on other segments.

A computing device travelling from a wireless (e.g., Wi-Fi) to a wired connection and vice versa can maintain and block an assigned segment or VLAN. Essentially, VLAN assignment is independent of any changes in wired or wireless connectivity.

Personal computing devices versus corporate computing devices using the same credentials (i.e., belonging to a common user) are assigned different segments (e.g., subnets or VLANs). In other words, multiple computing devices with different hyper contexts may be assigned to different segments even though they may belong to a common user.

Infrastructure devices management interfaces may be restricted to specific segments or VLANs.

Risky computing devices may be dynamically moved to a segment or VLAN where deeper inspection is performed (quarantine). These computing devices may be blocked on wired and Wi-Fi connections. When a risk associated with a computing device reduces or is eliminated, the computing device is automatically moved back to its correct segment or VLAN.

In an embodiment, a basic set of components needed to implement a dynamic microsegmentation system includes:

Hyper context cloud server 110

One or more access points (e.g., access point 104)

One or more network switches that enable dynamic segment or VLAN assignment for associated ports (e.g., network switch 106).

An access point may include the following features or capabilities:

Creating labels and associating these labels with segments or VLANs.

Associating MAC addresses dynamically with these labels.

When a MAC address gets associated with a label, a change of authorization (CoA) is triggered by hyper context cloud server 110 to cloud controller 108. Cloud controller 108 then uses one or more access points to disconnect a computing device off of the network and force the computing device to reauthenticate.

Intercepting the reauthentication process associated with the computing device. Subsequent to the reauthentication, segmenting the computing device onto a segment (or VLAN) associated with the label rather than the default segment (or VLAN) that the computing device was initially segmented onto.

A wired network access point (e.g., a network switch or a switch) may be enabled with the following functionalities:

Hyper context cloud server 110 finds the switch and the port on that switch to which a computing device is connected.

Hyper context cloud server 110 issues a disconnect to the computing device on that port.

Hyper context cloud server 110 reconfigures the port of that switch and assigns the new VLAN to it.

Hyper context cloud server 110 then connects the computing device back on the new VLAN and issues a COA via switch which can result in device getting a new IP address from the reassigned VLAN.

Figure 8:
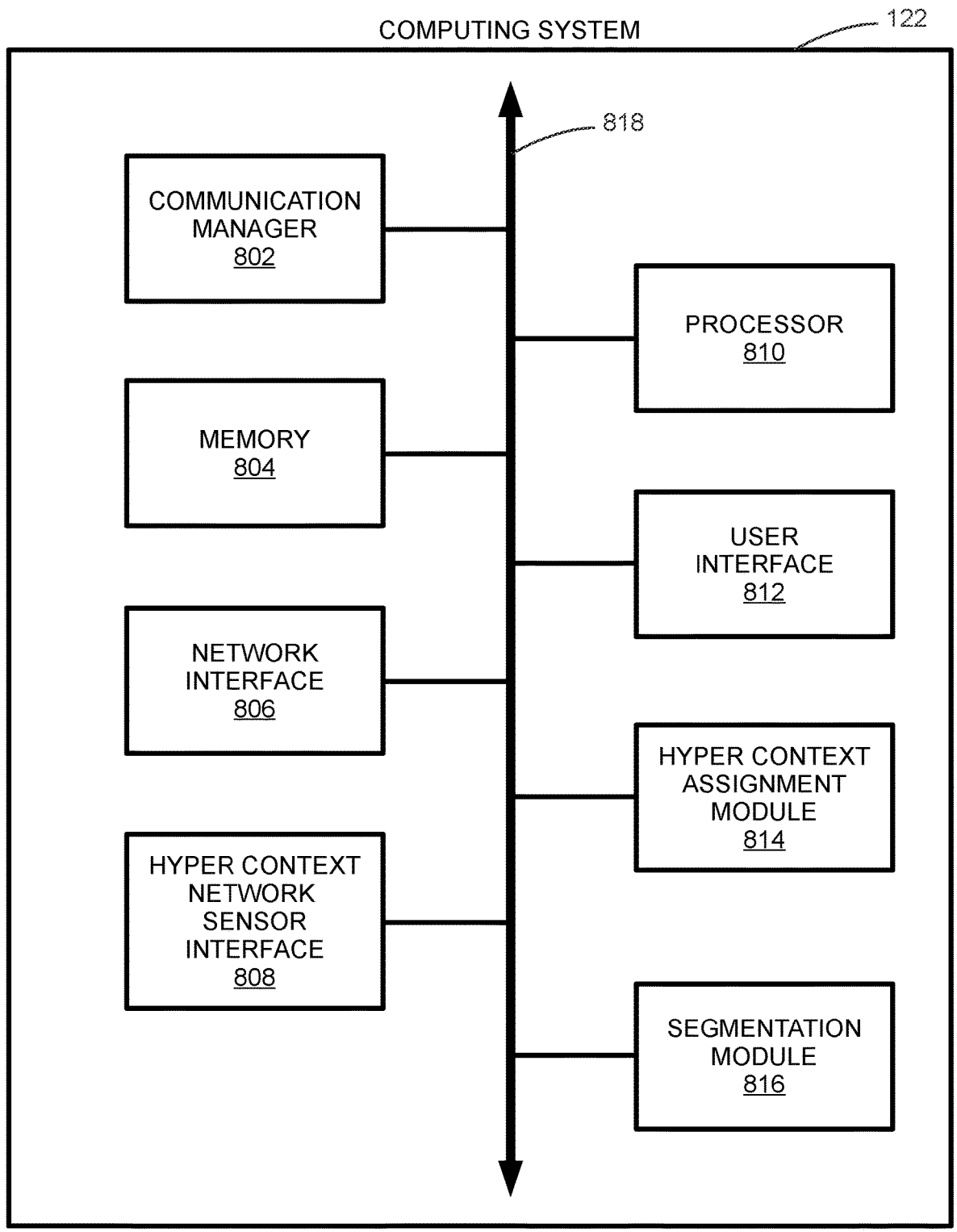
FIG. 8 is a block diagram depicting an example architecture of a computing system.

FIG. 8 is a block diagram depicting an example architecture of a computing system, such as, for example, computing system 122. As described, computing system 122 may perform functions associated with methods 600 and 700. As depicted, computing system 122 includes communication manager 802, memory 804, network interface 806, hyper context network sensor interface 808, processor 810, user interface 812, hyper context assignment module 814, segmentation module 816, and data bus 818.

Communication manager 802 can be configured to manage communication protocols and associated communication with external peripheral devices as well as communication with other components in computing system 122. For example, communication manager 802 may be responsible for generating and maintaining a communication interface between computing system 122 and cloud controller 108.

Memory 804 is configured to store data associated with the dynamic microsegmentation applications described herein. Memory 804 may include both long-term memory and short-term memory. Memory 804 may be comprised of any combination of hard disk drives, flash memory, random access memory, read-only memory, solid state drives, and other memory components.

Hyper context network sensor interface 806 enables computing system 122 to interface and communicate with hyper context network sensor 112. In an aspect, computing system 122 may communicate with hyper context network sensor 112 using a public network such as the Internet.

Processor 810 is configured to perform functions that may include generalized processing functions, arithmetic functions, and so on. Processor 810 is configured to process information associated with the systems and methods described herein.

User interface 812 allows a user to interact with aspects of the invention described herein. User interface 812 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Hyper context assignment module 814 is configured to access a hyper context set, locate a network hyper context from within the hyper context set, and assign the network hyper context to a computing device (e.g., stages 604-608 or 704-708).

Segmentation module 816 is configured to access a policy defining a segment, assign the segment identifier to a computing device, and segment the computing device onto the segment (e.g., stages 610-614 or 710-714).

Data bus 818 communicatively couples the different components of computing system 122, and allows data and communication messages to be exchanged between these different components.

Figure 9:
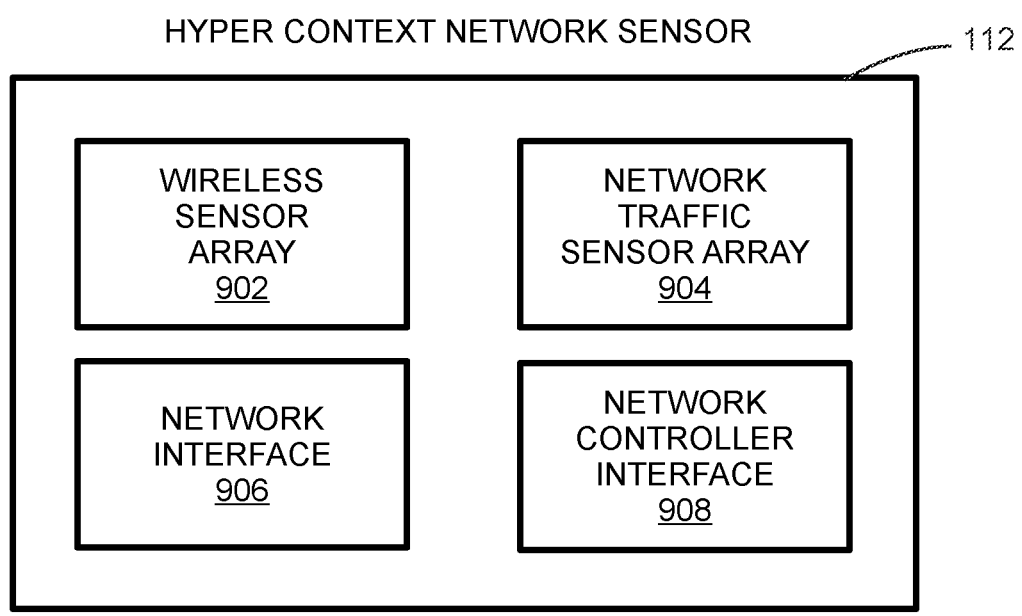
FIG. 9 is a block diagram depicting an example architecture of a hyper context network sensor.

FIG. 9 is a block diagram depicting an example architecture of a hyper context network sensor 112. In an aspect, hyper context network sensor 112 includes a wireless sensor array 902, a network traffic sensor array 904, a network interface 906, and a network controller interface 908. Details about wireless sensor array 902 and network traffic sensor array 904 are provided herein.

In an aspect, network interface 906 enables hyper context network sensor 112 to connect to a network such as computer network 116. Network interface 906 may also enable hyper context network sensor 112 to connect to a public network such as the Internet, and communicate with hyper context cloud controller 108.

In an aspect, network controller interface 908 enables hyper context network sensor 112 to connect to network switch 106. Network controller interface 908 allows hyper context network sensor 112 to monitor span traffic 120 associated with computing device communication over computer network 116.

Figure 10:
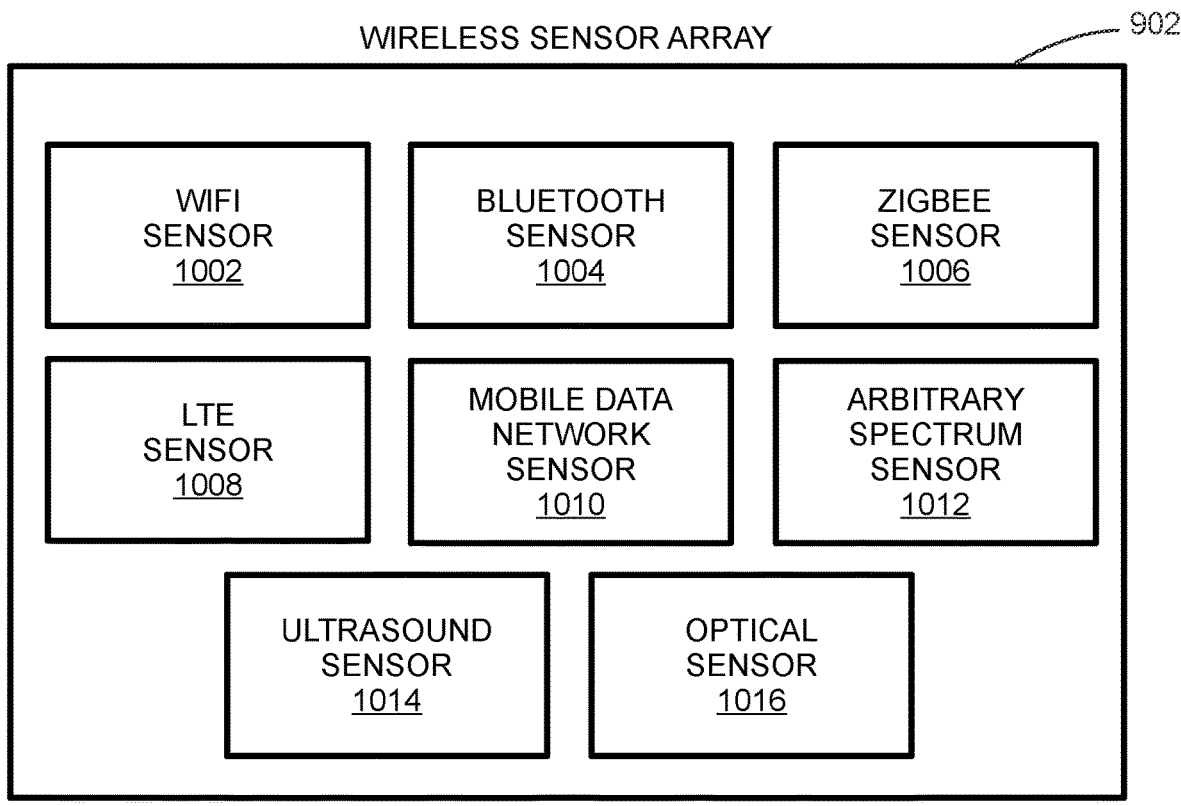
FIG. 10 depicts an example architecture of a wireless sensor array.

FIG. 10 depicts an example architecture of a wireless sensor array 902. As depicted, wireless sensor array includes WiFi sensor 1002, Bluetooth sensor 1004, Zigbee sensor 1006, LTE sensor 1008, mobile data network sensor 1010, arbitrary spectrum sensor 1012, ultrasound sensor 1014, and optical sensor 1016.

Wireless sensor array 902 can be configured to scan a physical area in a vicinity of a computer network, such as, for example, computer network 116, Wireless sensor array 902 can detect any RF spectrum signals associated with the area and any non-RF wireless signals associated with the area. Wireless sensor array 902 can also detect and receive any data communication packets associated with the RF signals and the non-RF wireless signals. Essentially, wireless sensor array 902 scans the RF and other spectra to determine any existing RF communication signals and/or any non-RF wireless communication signals being used by computing devices, such as, for example, by 102 or 103. In an aspect, information gathered by wireless sensor array 902 is sent to hyper context cloud server 110. This information becomes part of a hyper context associated with a computing device.

WiFi sensor 1002 can be configured to detect and receive any WiFi communication packets being used for communication, for example, by computing device 103 over the associated communication network, for example, computer network 116. In an aspect, WiFi sensor may be configured to detect communication packets transmitted to and from computing device 103 via access point 104. In some embodiments, WiFi sensor 1002 is a WiFi packet sniffer.

Bluetooth sensor 1004 can be configured to detect and receive any Bluetooth communication packets being used for communication, for example, by computing devices 102, 103, or 142, via one or more peer-to-peer Bluetooth communication links. In some embodiments, Bluetooth sensor 1004 is a Bluetooth packet sniffer.

ZigBee sensor 1006 can be configured to detect and receive any ZigBee communication packets being used for communication by, for example, computing devices 102, 103, or 142 via a ZigBee communication link. In some embodiments, ZigBee sensor 1006 is a ZigBee packet sniffer.

LTE sensor 1008 can be configured to detect long term evolution (LTE) signals being used for communication, for example, by computing devices 102, 103, or 142.

Mobile data network sensor 1010 can be configured to detect communication, for example, by computing devices 102, 103, or 142, via other mobile data communication techniques, such as, General Packet Radio Service (GPRS), 3G, 3G+4G, 4G+5G, Global System for Mobile Communications (GSM), Universal Mobile Telecommunications Service (UMTS), and so on.

Arbitrary spectrum sensor 1012 can be configured to detect and receive RF communication data associated with any arbitrary RF communication protocol used by, for example, computing devices 102, 103, or 142.

In addition to sensors configured to detect RF communication signals, wireless sensor array 902 can include components capable of detecting non-RF wireless signals, such as, ultrasound communication signals and optical communication signals. More specifically, ultrasound sensor 1014 can be configured to detect communication data associated with any ultrasonic (ultrasound) communication links used by, for example, computing devices 102, 103, or 142. Optical sensor 1016 can be configured to detect communication data associated with any wireless optical data links used by, for example, computing devices 102, 103, or 142.

Figure 11:
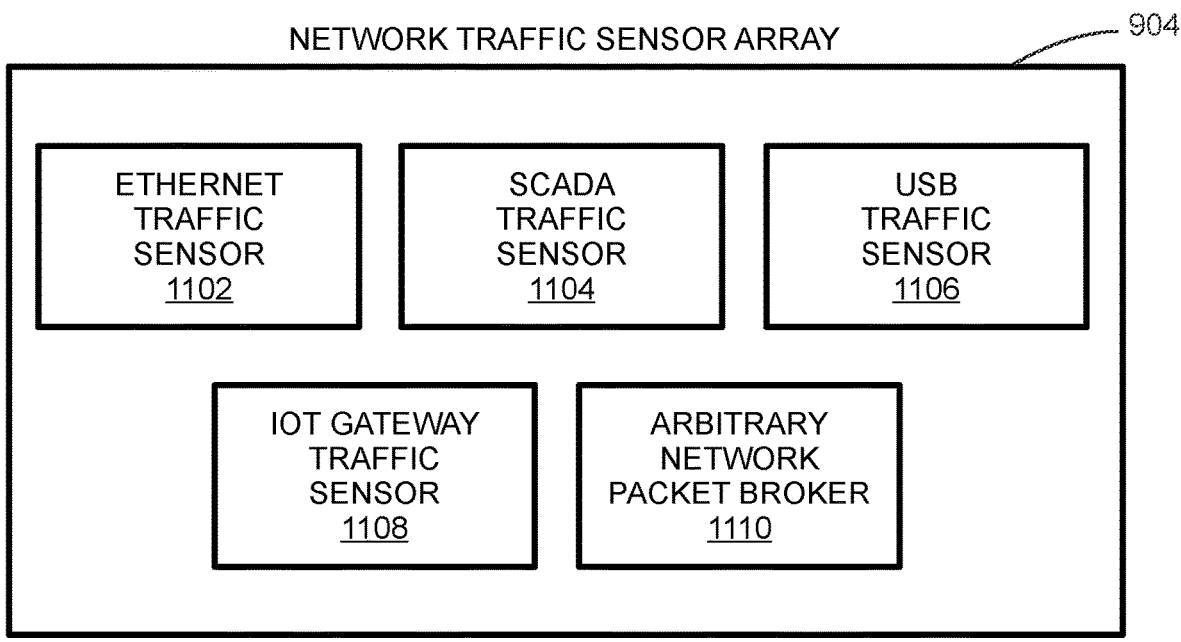
FIG. 11 depicts an example architecture of a network traffic sensor array.

FIG. 11 depicts an example architecture of a network traffic sensor array 904. As depicted, network sensor array 904 includes Ethernet traffic sensor 1102, SCADA traffic sensor 1104, USB traffic sensor 1106, IoT gateway traffic sensor 1108, and arbitrary network packet broker 1110. In general, network traffic sensor array 904 can be configured to detect any network traffic-related communication data associated with computing devices, for example, 102, 103, or 142, on a network, for example, computer network 116.

Ethernet traffic sensor 1102 can be configured to detect, receive and process Ethernet traffic communication data associated with computing devices, for example, 102, 103, or 142. SCADA traffic sensor 1104 can be configured to detect, receive and process SCADA communication data associated with computing devices, for example, 102, 103, or 142. USB traffic sensor 1106 can be configured to detect, receive and process USB communication data associated with computing devices, for example, 102, 103, or 142.

IoT gateway traffic sensor 1108 can be configured to detect, receive, and process communication data associated with Internet-of-Things (IoT) devices. Arbitrary network packet broker 1110 can be configured to detect, receive and process arbitrary network packets received by network traffic sensor array 904.

Figure 12:
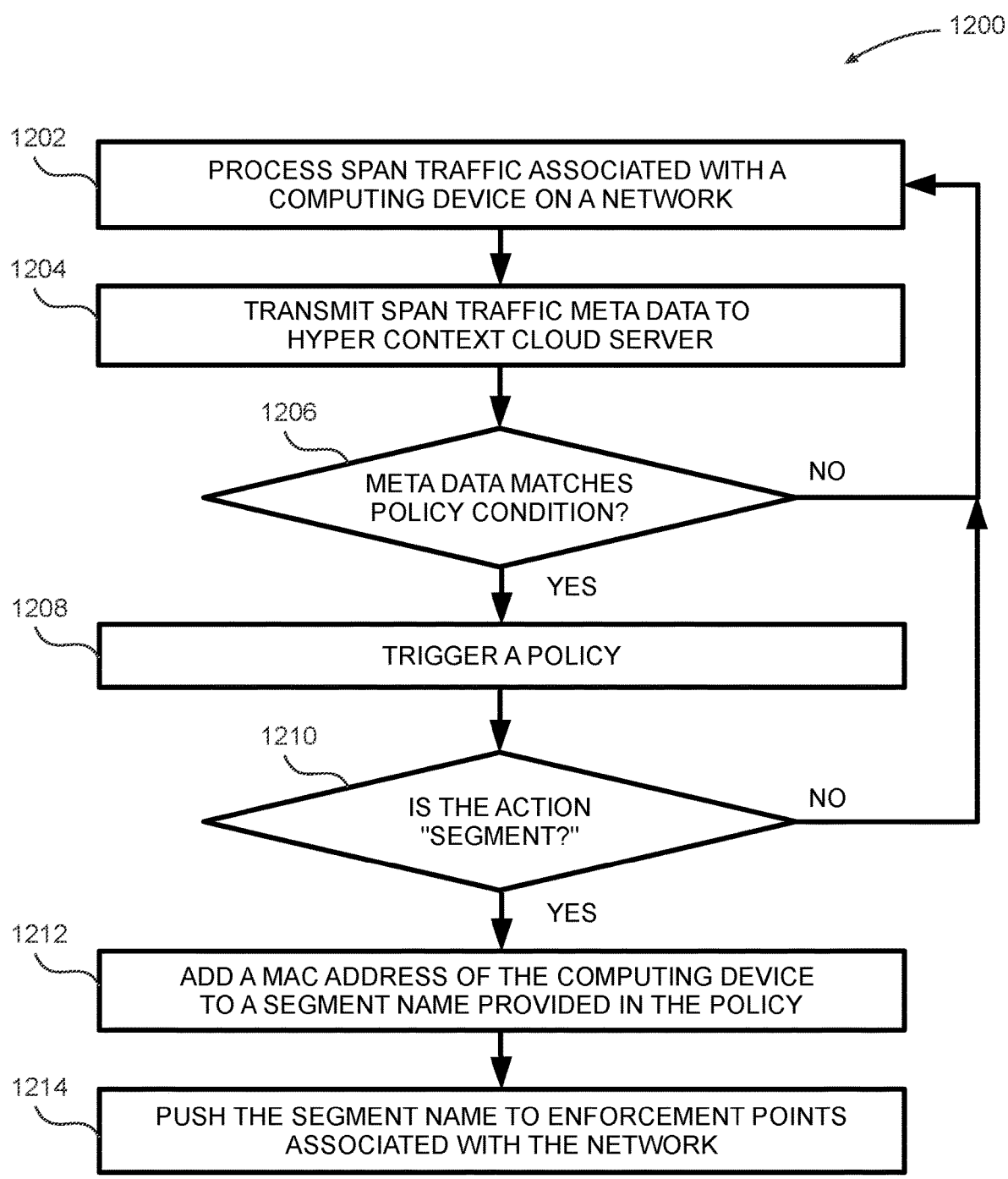
FIG. 12 is a flow diagram depicting an example method for a policy flow.

FIG. 12 is a flow diagram depicting an example method 1200 for a policy flow.

Method 1200 includes processing span traffic associated with a computing device on a network (1202). For example, hyper context network sensor 112 may monitor span traffic associated with computing device 102 communicating over computer network 116. Hyper context network sensor 112 may also process the span traffic to extract or generate span traffic meta data from the span traffic data.

Method 1200 includes transmitting span traffic meta data to hyper context cloud server 110 (1204). For example, hyper context network sensor 112 can transmit the span traffic meta data to hyper context cloud server 110.

Method 1200 includes determining whether the span traffic meta data matches a policy condition (1206). For example, hyper context cloud server 110 can process the span traffic meta data to determine whether the span traffic meta data matches a policy condition. If the span traffic meta data does not match a policy condition (NO at 1206), then method 1200 returns to 1202.

If the span traffic metadata matches a policy condition (YES at 1206), then method 1200 includes triggering a policy (1208). For example, hyper context cloud server 110 can trigger a policy.

Method 1200 includes determining whether an action associated with the triggered policy is "Segment" (1210). For example, hyper context cloud server 100 can determine if an action associated with triggered policy is a "segment". If the action is not "Segment" (NO at 1210), then method 1200 returns back to 1202.

If the action is "Segment" (YES at 1210), then method 1200 includes adding a MAC address of the computing device to a segment name provided in the policy (1212). For example, hyper context cloud server 110 can invoke cloud controller 108 to add the MAC address of the computing device to a segment name (label) provided in the policy.

Method 1200 includes pushing the segment name to one or more enforcement points associated with the network (1214). In an aspect, an enforcement point may be an access point such as access point 104, or a network switch such as network switch 106. An enforcement point in the network may be a point where a cloud controller such as cloud controller 108 can enforce one or more policies associated with the network. In this sense, an enforcement point may be a cloud-managed enforcement point. Other examples of enforcement points are a cloud-based access point, a cloud radius provider, and hyper context network sensor 112. For example, cloud controller 108 can add the given MAC address to the label and pushes the segment name to enforcement points (e.g., access point 104) associated with a network such as computer network 116. In an aspect, the segment name is pushed to all enforcement points associated with the network. In another aspect, hyper context network sensor 112 enforces the action to one or more network access controllers, local radius servers, and DHCP servers associated with the network.

Figure 13:
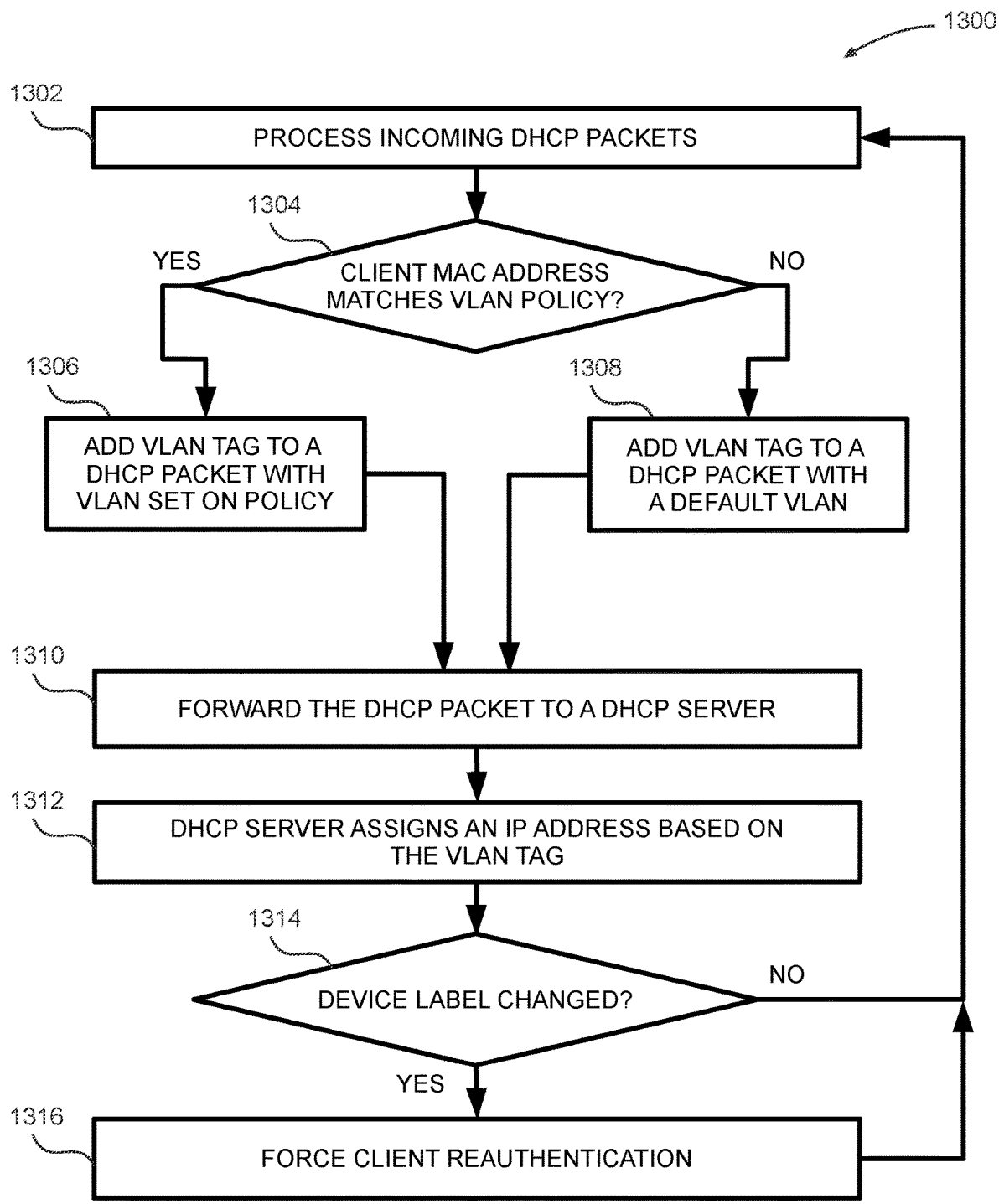
FIG. 13 is a flow diagram depicting an example method for a packet flow.

FIG. 13 is a flow diagram depicting an example method 1300 for a packet flow.

Method 1300 includes processing incoming DHCP packets (1302). For example, cloud controller 108 can process any incoming DHCP packets associated with computer network 116.

Method 1300 includes determining whether a client MAC address associated with the DHCP packets from computing system 102 or computing system 103 matches a VLAN policy (1304). For example, based on a configuration associated with cloud controller 108, access points 104 and/or Network switch 106 can determine whether a client MAC address associated with the DHCP request packets matches a VLAN policy.

If the client MAC address matches a VLAN policy (YES at 1304), method 1300 includes adding a VLAN tag to a DCHP client packet (also known as a "DHCP packet") with a VLAN set on the matched VLAN policy (1304). If the client MAC address does not match a VLAN policy (NO at 1304), method 1300 includes adding a VLAN tag to a DHCP packet with a default VLAN (1306). Cloud controller 108 can add a VLAN tag to a DHCP packet with a default VLAN or with a VLAN set on the VLAN policy.

Method 1300 includes forwarding the DHCP packet to a DHCP server (1310). In an aspect, network switch 106 forwards a DHCP packet received from computing system 102 or computing system 103 via access point 104 to DHCP server 114. In this sense, network switch 106 functions as a trunk port.

Method 1300 includes a DHCP server (e.g., DHCP server 114) assigning an IP address based on the VLAN tag (1312). In an aspect, DHCP server 114 assigns the IP address from an appropriate pool based on the incoming VLAN of the packet. For example, a VLAN tag corresponding to VLAN 10 can result in an assigned IP address that in a range of 10.1.10.1-10.1.10.100, from DHCP pool VLAN10 contained in DHCP server 114.

Method 1300 includes determining whether a label associated with a computing device (e.g., a device label) has changed (1314). In an aspect, cloud controller 108 or hyper context server 110 determines if a label associated with a computer device has changed. If the device label has not changed (NO at 1314), method 1300 returns to 1302.

If the device label has changed (YES at 1314), method 1300 includes forcing a client reauthentication (1316). For example, cloud controller 108 or hyper context server 110 can force client reauthentication. Forced client reauthentication can include actions such as terminating an existing session associated with the computing device, or performing a bounce port. The method then returns to 1302, which essentially forces the computing device to perform DHCP again. The policy is then re-enforced by cloud controller 108, and a correct VLAN can be assigned.

Force reauthentication can account for scenarios such as a change in a physical location of a computing device within computer network 116 (e.g., moving from a corporate office to a conference room). Method 1300 helps ensure that a computing device is consistently assigned to a specific VLAN even if conditions associated with the computing device (e.g., physical location) change.

Figure 14:
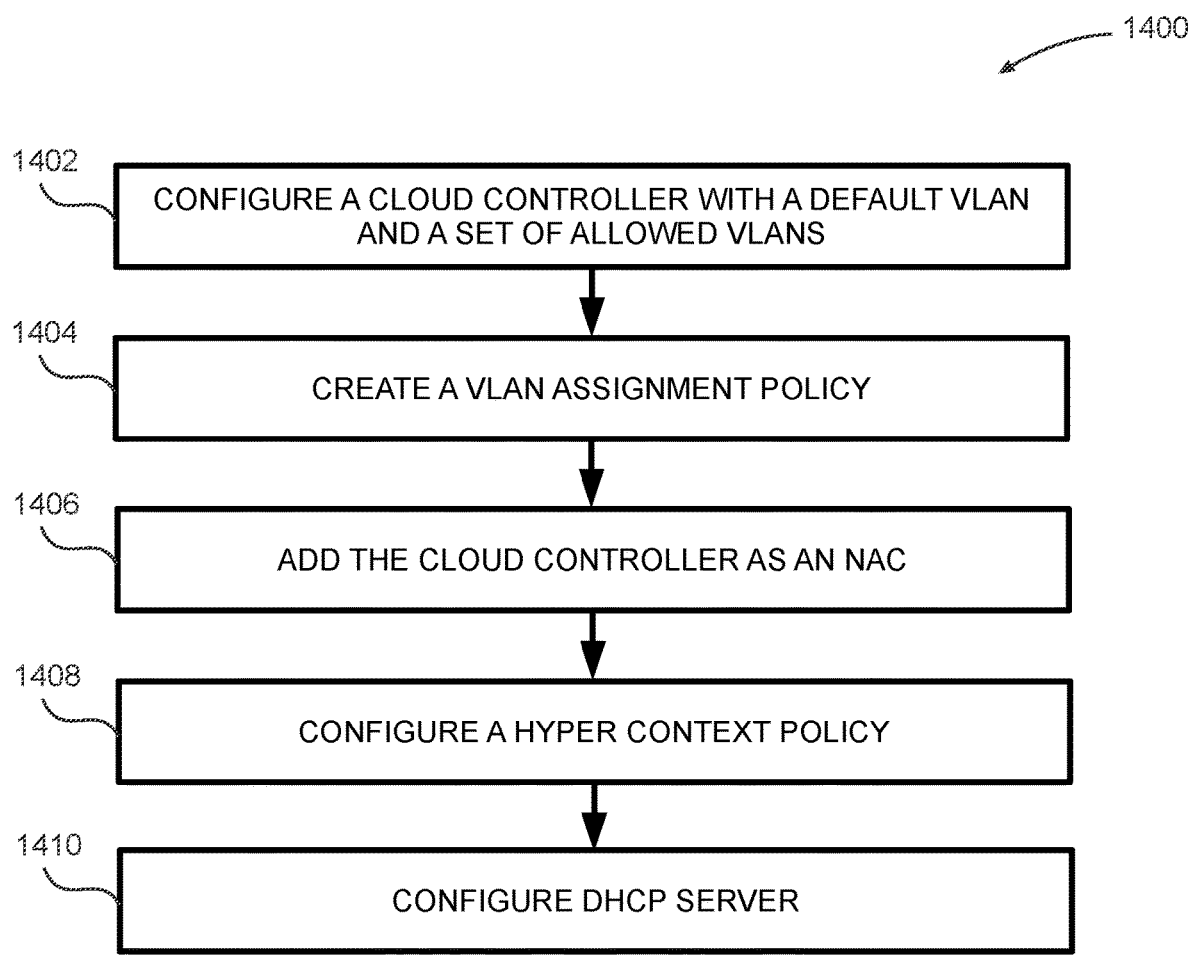
FIG. 14 is a flow diagram depicting an example method for a configuration flow.

FIG. 14 is a flow diagram depicting an example method 1400 for a configuration flow. In an aspect, method 1400 is used to configure a dynamic microsegmentation system such as dynamic microsegmentation system 100 or dynamic microsegmentation system 200.

Method 1400 includes configuring a cloud controller with a default VLAN and a set of allowed VLANs (1402). For example, cloud controller 108 can be configured with a default VLAN=1 and allowed VLANs=10, 20, or 30.

Method 1400 includes creating a VLAN assignment policy (1404). For example, cloud controller 108 can create a VLAN assignment policy with the following parameters:
Policy: Input=Labels:Action=Assign VLAN<VLAN number>

Method 1400 includes adding the cloud controller as a NAC (1406). For example, cloud controller 108 can be added as a NAC. In an aspect, adding cloud controller 108 as a NAC can include adding credentials for any application programming interface (API) endpoints associated with cloud controller 108. Cloud controller 108 may be added as a NAC in hyper context cloud server 110.

Method 1400 includes configuring a hyper context policy (1408). For example, hyper context cloud server 110 may be configured with one or more hyper context policies. Configuring a hyper context policy can also include setting the NAC to the configured cloud controller 108, setting an associated action to "Segment," and setting a name associated with the segment (i.e., a segment name) to that of cloud controller 108.

Method 1400 includes configuring a DHCP server (1410). For example, DHCP server 114 can be configured. Configuring DHCP server 114 can include interfacing VLANs with associated DHCP VLAN pools while ensuring that the VLANs in the DHCP VLAN pool should match an associated VLAN assignment on cloud controller 108.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
a network traffic controller associated with a network, the network traffic controller configured to enable an interface of a computing device on the network;
a hyper context network sensor configured to observe span traffic associated with the network and detect the computing device on the network via the network traffic controller;
a hyper context cloud server configured to receive data associated with the span traffic, assign a network hyper context to the computing device based on network properties and computing device properties associated with the computing device, and access a policy defining a virtual local area network (VLAN) identifier identifying a VLAN and corresponding to the network hyper context; and
a cloud controller configured to segment the computing device onto the VLAN responsive to detecting the computing device.

2. The apparatus of claim 1, wherein the hyper context cloud server detects a change in a connectivity type utilized by the computing device, and wherein the cloud controller re-segments the computing device onto the VLAN subsequent to detecting the change in connectivity type.

3. The apparatus of claim 2, wherein the re-segmenting includes de-authenticating the computing device from the network.

4. The apparatus of claim 2, wherein detecting a change in connectivity type utilized by the computing device comprises detecting a change from wireless connectivity to wired connectivity.

5. The apparatus of claim 2, wherein detecting a change in connectivity type utilized by the computing device comprises detecting a change from wired connectivity to wireless connectivity.

6. The apparatus of claim 1, wherein prior to assigning a network hyper context to the computing device, the hyper context cloud server:
accesses a hyper context set defining a plurality of possible network hyper contexts and corresponding policies; and
locates the network hyper context from within the hyper context set based on the network properties and computing device properties, the corresponding policies of the hyper context set defining that devices assigned the network hyper context are to be segmented onto the VLAN.

7. The apparatus of claim 6, wherein the hyper context set is generated based on one or more computing device properties and network properties.

8. The apparatus of claim 6, wherein segmenting the computing device onto the VLAN comprises enforcing the corresponding policies of the hyper context on the computing device.

9. The apparatus of claim 1, wherein the cloud controller blocks a computing device that is prevented from joining the network.

10. The apparatus of claim 1, wherein the hyper context cloud server blacklists a computing device that is prevented from joining the network.

11. An apparatus comprising:
a network access point configured to interface a computing device with a network;
a network switch associated with the network, the network switch connected to the access point and configured to route communication data between the computing system and the network;
a hyper context network sensor configured to observe network span traffic routed via the network switch, and detect the computing device on the network based on the observation; and a hyper context cloud server configured to receive data associated with the span traffic, assign a network hyper context to the computing device based on network properties and computing device properties associated with the computing device, access a policy defining a segment identifier identifying a segment and corresponding to the network hyper context, and segment the computing device onto the segment responsive to detecting the computing device.

12. The apparatus of claim 11, wherein the hyper context cloud server detects a change in a connectivity type utilized by the computing device, and wherein the hyper context cloud server re-segments the computing device onto the segment subsequent to detecting the change in connectivity type.

13. The apparatus of claim 12, wherein the re-segmenting includes de-authenticating the computing device from the network.

14. The apparatus of claim 12, wherein detecting a change in connectivity type utilized by the computing device comprises detecting a change from wireless connectivity to wired connectivity.

15. The apparatus of claim 12, wherein detecting a change in connectivity type utilized by the computing device comprises detecting a change from wired connectivity to wireless connectivity.

16. The apparatus of claim 11, wherein prior to assigning a network hyper context to the computing device, the hyper context cloud server:
   accesses a hyper context set defining a plurality of possible network hyper contexts and corresponding policies; and
   locates the network hyper context from within the hyper context set based on the network properties and computing device properties, the corresponding policies of the hyper context set defining that devices assigned the network hyper context are to be segmented onto the segment.

17. The apparatus of claim 16, wherein the hyper context set is generated based on one or more computing device properties and network properties.

18. The apparatus of claim 16, wherein segmenting the computing device onto the segment comprises enforcing the corresponding policies of the hyper context on the computing device.

19. The apparatus of claim 11, wherein the hyper context cloud server blocks a computing device that is prevented from joining the network.

20. The apparatus of claim 11, wherein the hyper context cloud server blacklists a computing device that is prevented from joining the network.

21. The apparatus of claim 11, further comprising a network access controller connected to the network switch, the network access controller configured to provide network access control associated with the network.

22. The apparatus of claim 11, wherein the hyper context cloud server accesses the policy from the network access controller, via the network switch.

23. An apparatus comprising:
   a network access point configured to interface a computing device with a network;
   a network switch associated with the network, the network switch connected to the access point and configured to route communication data between the computing system and the network;
   a hyper context network sensor configured to observe network span traffic routed via the network switch, and detect the computing device on the network via the network switch; and
   a hyper context cloud server configured to receive data associated with the span traffic, assign a network hyper context to the computing device based on network properties and computing device properties associated with the computing device, access a policy defining a virtual local area network (VLAN) identifier identifying a VLAN and corresponding to the network hyper context, and segment the computing device onto the VLAN responsive to detecting the computing device.

* * * * *